US008793079B2

(12) United States Patent
Angelsen et al.

(10) Patent No.: US 8,793,079 B2
(45) Date of Patent: Jul. 29, 2014

(54) METHOD FOR IMAGING OF NONLINEAR INTERACTION SCATTERING

(75) Inventors: Bjørn A. J. Angelsen, Trondheim (NO); Rune Hansen, Trondheim (NO); Thor Andreas Tangen, Trondheim (NO)

(73) Assignee: Surf Technology AS, Trondheim (NO)

( * ) Notice: Subject to any disclaimer, the term of this patent is extended or adjusted under 35 U.S.C. 154(b) by 340 days.

(21) Appl. No.: 13/213,965

(22) Filed: Aug. 19, 2011

(65) Prior Publication Data
US 2012/0095699 A1    Apr. 19, 2012

Related U.S. Application Data

(60) Provisional application No. 61/375,403, filed on Aug. 20, 2010.

(30) Foreign Application Priority Data

Nov. 9, 2010  (GB) .................................... 1018933.0

(51) Int. Cl.
G06F 19/00        (2011.01)
(52) U.S. Cl.
USPC .......... 702/33; 600/438; 600/443; 250/208.1; 250/221; 250/559.4
(58) Field of Classification Search
USPC .......................................................... 702/33
See application file for complete search history.

(56) References Cited

U.S. PATENT DOCUMENTS

| 5,521,882 | A | 5/1996 | D'Angelo et al. |
| 5,601,086 | A | 2/1997 | Pretlow, III et al. |
| 5,736,642 | A | 4/1998 | Yost et al. |
| 6,123,669 | A | 9/2000 | Kanda |
| 7,301,852 | B2 | 11/2007 | Leggett, III et al. |
| 2005/0036403 | A1* | 2/2005 | Leggett et al. ................. 367/32 |
| 2010/0036244 | A1 | 2/2010 | Angelsen et al. |

FOREIGN PATENT DOCUMENTS

| WO | WO 02/29433 | 4/2002 |
| WO | WO 2007/013814 | 2/2007 |
| WO | WO 2007/030016 | 3/2007 |
| WO | WO 2010/121202 | 10/2010 |

* cited by examiner

Primary Examiner — Jonathan C Teixeira Moffat
Assistant Examiner — Hien Vo
(74) Attorney, Agent, or Firm — Cozen O'Connor

(57) ABSTRACT $1^{st}$ and $2^{nd}$ pulsed waves are transmitted along $1^{st}$ and $2^{nd}$ transmit beams where at least one of the beams is broad in at least one direction, and the transmit timing between said $1^{st}$ and $2^{nd}$ pulsed waves are selected so that the pulsed wave fronts overlap in an overlap region R(r,t) that propagates along at least one measurement or image curve $\Gamma(r)$ in the material object. At least the scattered signal produced by nonlinear interaction between said $1^{st}$ and $2^{nd}$ waves in the overlap region is received and processed to form a nonlinear interaction scattering image signal along $\Gamma(r)$. The measurement or image curve $\Gamma(r)$ can be scanned laterally by either changing of the relative transmit timing between the $1^{st}$ and $2^{nd}$ pulsed waves or the direction of at least one of the $1^{st}$ and $2^{nd}$ transmit beams, or both. The methods are applicable to image nonlinear scattering sources for both electromagnetic and elastic waves, and combinations of these.

34 Claims, 13 Drawing Sheets

METHOD FOR IMAGING OF NONLINEAR INTERACTION SCATTERING

CROSS-REFERENCE TO RELATED APPLICATIONS

This is a U.S. Utility application based on U.S. Provisional Application No. 61/375,403, filed Aug. 20, 2010. Priority is claimed on GB Application No. 1018933.0, filed Nov. 9, 2010, the contents of which are incorporated herein by reference in its entirety.

FIELD OF THE INVENTION

The present invention addresses imaging of nonlinear scattering with elastic and electromagnetic waves and combinations of these. It has applications both in medical and technical fields.

BACKGROUND OF THE INVENTION

Material properties for both electromagnetic (EM) and elastic (EL) waves often show nonlinear properties where the material parameters depend on the amplitude of the field variables of the waves. Spatial variation in nonlinear material properties provide nonlinear scattering of both EM and EL waves, and imaging of such nonlinear scattering sources are in many situations useful to identify material properties. Both the forward wave propagation and local scattering of both EM and EL waves have mathematical similarities, and methods and instrumentation for imaging therefore have similar structures. Examples of uses of EL waves are material testing both with shear waves and compression waves, ultrasound medical imaging with compression waves, and SONAR sub-sea and geological measurements. EM waves have similar uses, where particularly new developments of EM technology in the high GHz and the THz range with wave lengths in the 0.1-1 mm range are being developed for medical imaging providing added information to the ultrasound images. EM imaging in the infra-red and optical frequency ranges also provides useful information both for material testing and medical imaging.

The nonlinear scattering can for both EM and EL waves be separated into a parametric and a resonant scattering type. For EL waves, the parametric scattering originates from a non-linear variation of the local elasticity parameters with the amplitude of the local elastic wave field, where spatial variations of the nonlinear variation produce the nonlinear scattering. For EM waves, the parametric scattering originates from a nonlinear variation of the local dielectric constant or magnetic permeability with the amplitude of the local EM wave field, where spatial variations of the nonlinear variation produce the nonlinear scattering. With elastic compression waves, referred to as acoustic waves, one for example gets strong nonlinear parametric scattering at the interface between soft materials and hard materials, for example as found with ultrasound nonlinear scattering from micro calcifications in soft tumor tissue or acoustic scattering from hard objects in soil like mines or other objects. One also gets strong nonlinear scattering at the interface between harder materials and much softer materials, for example as found with ultrasound scattering from gas micro-bubbles in blood or gas filled swim-bladders of fish and the like in water.

With a single frequency band incident wave, the parametric nonlinear scattering produces harmonic components of the incident frequency band in the scattered wave. With dual band incident waves that interact locally, the parametric nonlinear scattering produces bands around convolutions of the incident frequency bands which provide bands around sums and differences of the incident frequencies. However, the nonlinear variation of the material parameters also produces an accumulative nonlinear distortion of the forward propagating wave. When the pulse length of the high frequency pulse increases above approximately a half period of the low frequency pulse, the linear scattering from the nonlinear forward propagation distortion has a similar signature to the local nonlinear scattering, and it is in this case difficult to distinguish the signal components that occur from linear scattering of the nonlinear propagation distortion of the incident wave, and the signal components that occur from local nonlinear scattering. The present invention presents solutions in the form of methods and instrumentation that suppresses the components that originate from strong linear scattering of components produced by nonlinear forward propagation distortion and extracts the local nonlinear scattering components to produce a spatial imaging of the local nonlinear scattering sources.

Resonant nonlinear scattering has a time lag involved, which in some situations can be used to separate signal components from local nonlinear scattering and forward propagation distortion of the incident waves. However, the current invention provides further advantages for imaging of local resonant nonlinear scattering sources.

For acoustic waves, gas micro-bubbles show resonant scattering, for example, where the resonance originates from the energy exchange between the nonlinear elasticity of the bubble with shell and gas, and a co-oscillating fluid mass around the bubble with a volume approximately 3 times the bubble volume. As both the elasticity and the mass vary with bubble compression, the resonance frequency is nonlinearly affected by the incident acoustic wave field, producing a particularly strong nonlinear scattering with a large amount of harmonic components of the incident frequency (n-times the incident frequency) and even sub-harmonic components of the incident frequency (a fraction of the incident frequency) in the scattered field, and supra-harmonic components (bands around the harmonic components) of the incident frequency. However, for imaging at frequencies well above the bubble resonance frequency, the nonlinear scattering is much lower, and the present invention provides solutions for enhanced imaging of micro-bubbles at frequencies above the resonance frequency.

Resonant nonlinear EM scattering originates in the interaction between the wave field and the atoms and molecules, which is best described within the realm of quantum physics. Examples of EM resonant scattering are fluorescence which has similarities to sub-harmonic acoustic scattering. Two-photon quantum scattering is similar to $2^{nd}$ harmonic parametric scattering, but includes detailed dynamics with time lags in the process.

There is also found a nonlinear interaction between EM and EL waves in materials, where for example EL compression waves change the EM material parameters in the process called the acousto-optic effect. Absorption of EM waves in materials produces a radiation force and local heating of the material that generates acoustic waves in a process called the photo-acoustic effect. The invention hence addresses both EM and EL waves, and combinations of these, where the waves referred to in the description and claims can be EM and/or EL waves.

SUMMARY OF THE INVENTION

This summary gives a brief overview of components of the invention and does not present any limitations as to the extent of the invention, where the invention is solely defined by the claims appended hereto.

According to the invention there is provided a method for measurement or imaging of nonlinear interaction scattering between two waves along at least one measurement or image curve Γ(r) in a material object with nonlinear material parameters that produce wave scattering, comprising the steps of a) transmitting in at least one transmit event i) at least one $1^{st}$ transmit pulsed wave with a $1^{st}$ transmit time and a $1^{st}$ transmit center frequency along a $1^{st}$ transmit beam with a $1^{st}$ transmit direction, and ii) at least one $2^{nd}$ transmit pulsed wave with a $2^{nd}$ transmit time and a $2^{nd}$ transmit center frequency along a $2^{nd}$ transmit beam with a $2^{nd}$ transmit direction, where the $1^{st}$ and $2^{nd}$ transmit directions and $1^{st}$ and $2^{nd}$ transmit times are arranged so that the pulses from the $1^{st}$ and $2^{nd}$ pulsed waves overlap in space in an overlap region R(r,t) that propagates with time in the material object along a measurement or image curve Γ(r), and b) selecting one or both of i) the time relation between said $1^{st}$ and $2^{nd}$ transmit times, and ii) at least one of said $1^{st}$ and $2^{nd}$ transmit directions, to control the location of the measurement or image curve Γ(r) within the material object, and c) detecting a wave scattered from the overlap region R(r,t) with at least one receiver and generating at least one receive signal that includes at least nonlinear interaction scattered signal components that relate to waves that are scattered from the nonlinear interaction between said $1^{st}$ and $2^{nd}$ pulsed waves in said overlap region R(r,t), and d) processing the receive signal to extract the nonlinear interaction scattered signal components and to form nonlinear interaction measurement or image signals corresponding to said measurement or image curve Γ(r).

Preferably, the process to extract nonlinear interaction signal components includes temporal frequency filtering of the receive signal where said filtering passes said nonlinear interaction scattered signal components and blocks other temporal frequency components.

In preferred embodiments, a) said transmitting step comprises at least two transmit events and said $1^{st}$ and $2^{nd}$ transmit directions and the time lag between said $1^{st}$ and $2^{nd}$ transmit times are the same for said at least two transmit events, b) one of said $1^{st}$ and $2^{nd}$ pulsed waves is varied in at least one of polarity, amplitude, phase and frequency between said at least two transmit events, including the possibility that at least one of said $1^{st}$ and $2^{nd}$ pulsed waves has zero amplitude for at least one of said transmit events, and c) the process to extract nonlinear signal components includes combining of the receive signals from said at least two transmit events.

Preferably the receive signal from at least one of said at least two transmit events is one or both of i) delay corrected and ii) pulse distortion corrected, before the signals from said at least two transmit events are combined in step c).

In preferred embodiments, a) a plurality of measurement or image curves $\Gamma_k(r)$, k=1 . . . K, is selected in the material object through selecting one or both of i) the time relation between said $1^{st}$ and $2^{nd}$ transmit times, and ii) at least one of said $1^{st}$ and $2^{nd}$ transmit directions, and b) the measurement or image signals corresponding to each particular measurement or image curve $\Gamma_k(r)$ are obtained as described above.

Preferably the said transmitting step comprises transmitting a plurality of transmit events where the transmit time between said transmit events is sufficiently high that at least two different overlap regions propagate simultaneously within the object, and one or both of the relative timing between said $1^{st}$ and $2^{nd}$ transmit pulse and said $1^{st}$ and $2^{nd}$ transmit directions is varied between the transmit events so that said at least two different overlap regions propagate along at least two different measurement or image curves and the scattered signals from said different overlap regions are received and processed in parallel for improved rate of measurement or imaging.

In preferred embodiments, a) the pulse length of one of said $1^{st}$ and $2^{nd}$ pulsed waves is shorter than half the time oscillation period of the other of said $1^{st}$ and $2^{nd}$ waves so that the nonlinear interaction overlap region breaks up into sub-regions of high sensitivity where the wave field of said other of said $1^{st}$ and $2^{nd}$ waves has sufficiently high magnitude that the scattered signal is obtained with high sensitivity from a set $\Gamma_k(r)$, k=1 . . . K of more than one measurement or image curves in parallel, and b) the receive signal from said more than one measurement or image curves is received and processed in parallel to obtain the image signal for said more than one measurement or image curves in parallel.

Preferably the received signals from a plurality of transmit events for the same measurement or image curves Γ(r) are averaged to reduce noise and improve sensitivity.

Preferably image signals for image points between said measurement or image curves $\Gamma_k(r)$ are obtained through interpolation between image signals on at least two measurement or image curves.

Preferably said measurement or image curves $\Gamma_k(r)$ are spatially distributed across a surface to obtain image signals for a two dimensional image of nonlinear interaction scattering across said surface.

Preferably said measurement or image curves $\Gamma_k(r)$ are spatially distributed within a three-dimensional region to obtain image signals for a three-dimensional image of nonlinear interaction scattering in said region.

According to another aspect, the invention provides an apparatus for measurement or imaging of nonlinear interaction scattering between two waves along at least one measurement or image curve Γ(r) in a material object with nonlinear material parameters that produce wave scattering, comprising a) transmit means arranged to transmit at least one transmit event composed of i) at least one $1^{st}$ transmit pulsed wave with a $1^{st}$ transmit time and a $1^{st}$ transmit center frequency along a $1^{st}$ transmit beam with a $1^{st}$ transmit direction, and ii) at least one $2^{nd}$ transmit pulsed wave with a $2^{nd}$ transmit time and a $2^{nd}$ transmit center frequency along a $2^{nd}$ transmit beam with a $2^{nd}$ transmit direction, where the transmit means is arranged such that said $1^{st}$ and $2^{nd}$ beams overlap in an overlap region R(r,t) of the material object, where said overlap region propagates with time in the material object along a measurement or image curve Γ(r), b) control means arranged to select one or both of i) the time relation between said $1^{st}$ and $2^{nd}$ transmit times, and ii) at least one of said $1^{st}$ and $2^{nd}$ transmit directions, to control the location of the measurement or image curve Γ(r) in space within the material object, c) receive means arranged to receive scattered wave components from the material object at least from the nonlinear interaction between said $1^{st}$ and $2^{nd}$ pulsed waves in said overlap region R(r,t), and arranged to produce at least one receive signal containing at least nonlinear interaction scattered components from at least said overlap region R(r,t), and d) processing means arranged to process said receive signal to extract the nonlinear interaction scattered signal components from said overlap region R(r,t) to form nonlinear interaction measurement or image signals along the at least one measurement or image curve Γ(r).

Preferably said processing means comprises means for temporal frequency filtering of the receive signal where said filtering passes said nonlinear interaction scattered signal components and blocks other temporal frequency components.

In preferred embodiments, a) said transmit means is arranged to transmit at least two transmit events for each measurement or image curve $\Gamma(r)$, b) said transmit means comprises means for varying at least one of polarity, amplitude, phase and frequency of one of said $1^{st}$ and $2^{nd}$ pulsed waves between said at least two transmit events, allowing at least one of said $1^{st}$ and $2^{nd}$ pulsed waves to have zero amplitude for at least one of said at least two transmit events, and c) said processing means comprises means for combining the receive signals from at least two transmit events in the process of forming image signals along said measurement or image curve $\Gamma(r)$.

Preferably said processing means comprises means to correct at least one receive signal from at least one of said at least two transmit events with one or both of i) delay correction and ii) pulse distortion correction, before the signals from at least two transmit events are combined.

Preferably said processing means comprises means for estimation of one or both of i) delay correction and ii) pulse distortion correction.

Preferably said means for receiving comprises a focused receiver system. Preferably said focused receiver system is arranged to be dynamically focused with time such that the focus follows the overlap region $R(r,t)$ as the overlap region $R(r,t)$ moves with time. Preferably said focused receiver system is a focused camera.

In preferred embodiments, said focused receiver system comprises a) an array of multiple receiver elements that are arranged to receive the scattered signals in parallel, and b) means to generate multiple receive signals from multiple groups of receiver elements in parallel such that different receive signals are assigned to different measurement or image curves $\Gamma_m(r)$, m=1 . . . M in parallel.

Preferably said control means comprises means to transmit multiple groups of transmit events and means for averaging said different receive signals from the multiple groups of transmit events to produce different average receive signals and assign said different average receive signals to said different measurement or image curves.

A group of transmit events may be a single transmit event or multiple transmit events which provide a plurality of measurement or image curves. As described elsewhere in more detail, a single transmit event may give rise to a plurality of sub-regions of high sensitivity which in turn give rise to a plurality of measurement or image curves. Similarly, multiple transmit events (each of which may or may not give rise to a plurality of sub-regions) may give rise to multiple parallel measurement or image curves. The group of transmit events may then be transmitted multiple times so that the signals arising from each of the plurality of measurement or image curves can be averaged (i.e. resulting in an averaged signal for each measurement or image curve).

Preferably said control means comprises means to transmit multiple groups of transmit events to receive multiple receive signals for each measurement or image curve $\Gamma(r)$ and means for processing said multiple receive signals by at least one of i) averaging of the receive signals to increase signal to noise ratio and hence sensitivity, and ii) comparing differences between said multiple receive signals to determine movement of the scatterers.

Preferably said control means comprises means to scan said measurement or image curve $\Gamma(r)$ through a set of different measurement or image curves $\Gamma_k(r)$, k=1 . . . K in a region of the material object through varying one or both of i) the time relation between said $1^{st}$ and $2^{nd}$ transmit times, and ii) at least one of said $1^{st}$ and $2^{nd}$ transmit directions.

Preferably said means for processing comprises means for interpolating image signals between neighboring measurement or image curves $\Gamma_k(r)$ to generate image signals for image points between said neighboring measurement or image curves.

In some preferred embodiments said control means comprises means for scanning said measurement or image curves across a surface through said material object to provide image signals for a two dimensional image of nonlinear interaction scattering across said surface.

Said control means may include means for scanning said measurement or image curves within a three-dimensional region of said material object to provide image signals for a three-dimensional image of nonlinear interaction scattering in said region.

Preferably at least one of said $1^{st}$ and $2^{nd}$ transmit beams is wide in at least an azimuth direction. More preferably, the other of said $1^{st}$ and $2^{nd}$ transmit beams is narrow in at least the azimuth direction, and the receive means comprises a focused receive beam with axis along the axis of the transmit beam which is narrow in the azimuth direction, and scanning of the measurement or image curve is obtained by scanning of both the receive beam and the transmit beam which is narrow in the azimuth direction.

Preferably said transmit means and receive means comprise arrays of elements where the same array surface can be used to transmit both said $1^{st}$ and $2^{nd}$ pulsed waves and to receive at least the nonlinear interaction scattered signal.

Preferably said transmit means comprises an array of elements to transmit said $1^{st}$ pulsed wave and another array of elements to transmit said $2^{nd}$ pulsed wave.

Preferably said transmit means comprises a ring array of elements.

At least one of said $1^{st}$ and $2^{nd}$ pulsed waves may be an elastic compression wave. At least one of said $1^{st}$ and $2^{nd}$ pulsed waves may be an elastic shear wave. At least one of said $1^{st}$ and $2^{nd}$ pulsed waves may be an electromagnetic wave.

The methods and instrumentation are applicable for imaging of nonlinear material parameters both for electromagnetic and elastic waves and combinations of these. $1^{st}$ and $2^{nd}$ pulsed waves are transmitted along $1^{st}$ and $2^{nd}$ transmit beams where in preferred embodiments at least one of the beams is broad in at least one direction. The transmit timing between said $1^{st}$ and $2^{nd}$ pulsed waves is selected so that the wave pulses overlap in an overlap region $R(r,t)$ that propagates along a measurement or image curve $\Gamma(r)$ in the object. At least the scattered signal produced by nonlinear interaction scattering between said $1^{st}$ and $2^{nd}$ waves in the overlap region is received and processed to form nonlinear interaction scattering image signal(s) along $\Gamma(r)$. The measurement or image curve $\Gamma(r)$ may be scanned laterally in two or three dimensions by either changing of the relative transmit timing between the $1^{st}$ and $2^{nd}$ pulsed waves or the direction of the $1^{st}$ and $2^{nd}$ transmit beams, or both, to form two-dimensional or three-dimensional images of the object. The methods enhance measurement or imaging of scatterers that are either much softer or much harder than the surrounding medium, and are for example useful for, but not limited to, imaging of micro-calcifications and contrast agent gas micro-bubbles in medical imaging, hard structures like mines in the soil, gas bubble formation in the blood of divers, and swim bladders of fish and the like in water.

SUMMARY OF THE DRAWINGS

Certain preferred embodiments of the invention will now be described, by way of example only, and with reference to the accompanying drawings in which.

DETAILED DESCRIPTION OF THE PREFERRED EMBODIMENTS OF THE INVENTION

Figure 1A:
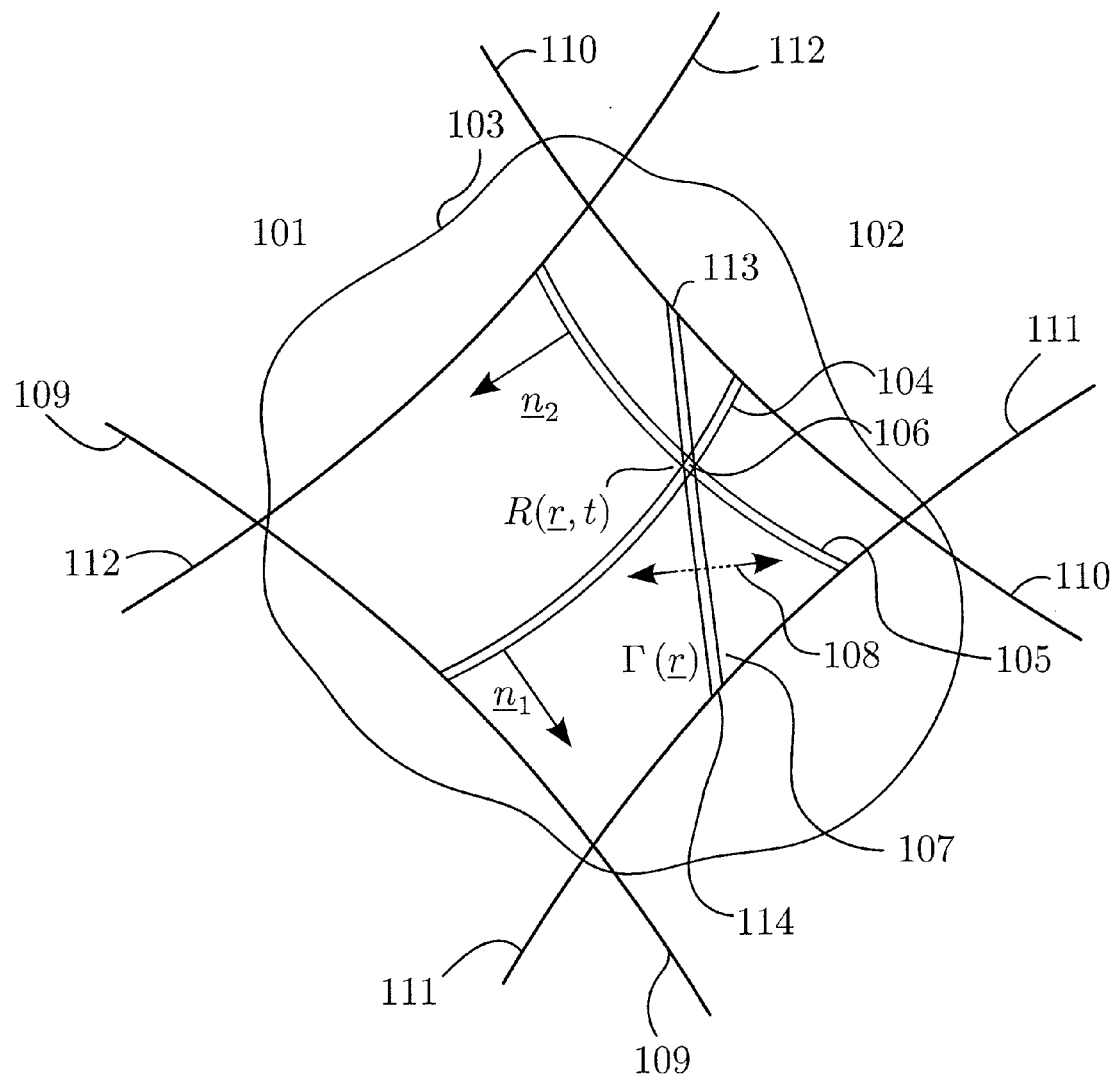
FIG. 1*a* illustrates the basic principle of obtaining a non-linear interaction measurement or image signal along a measurement or image curve Γ(r)
Figure 1B:
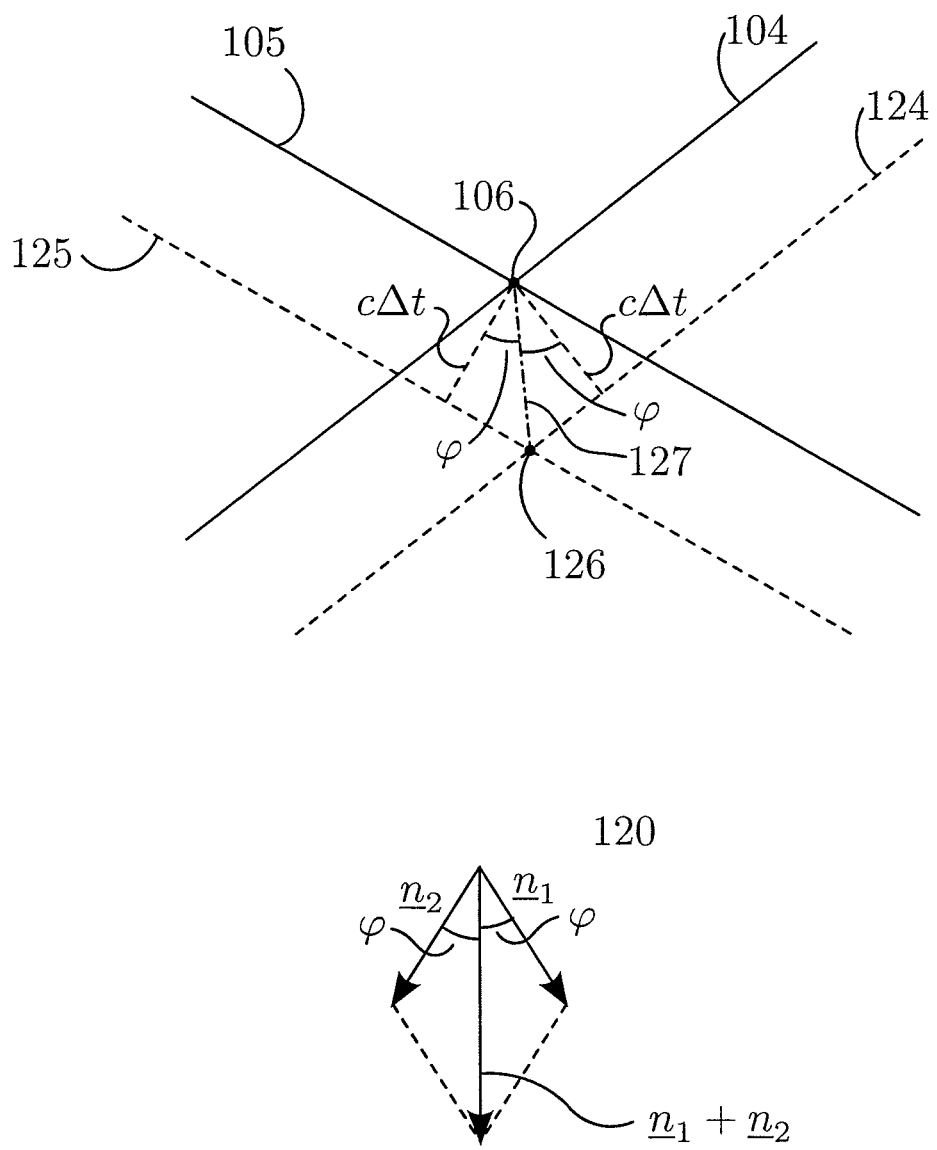
FIG. 1*b* illustrates calculation of the effective propagation velocity of the overlap region R(r,t) along the measurement or image curve Γ(r)
Figure 10:
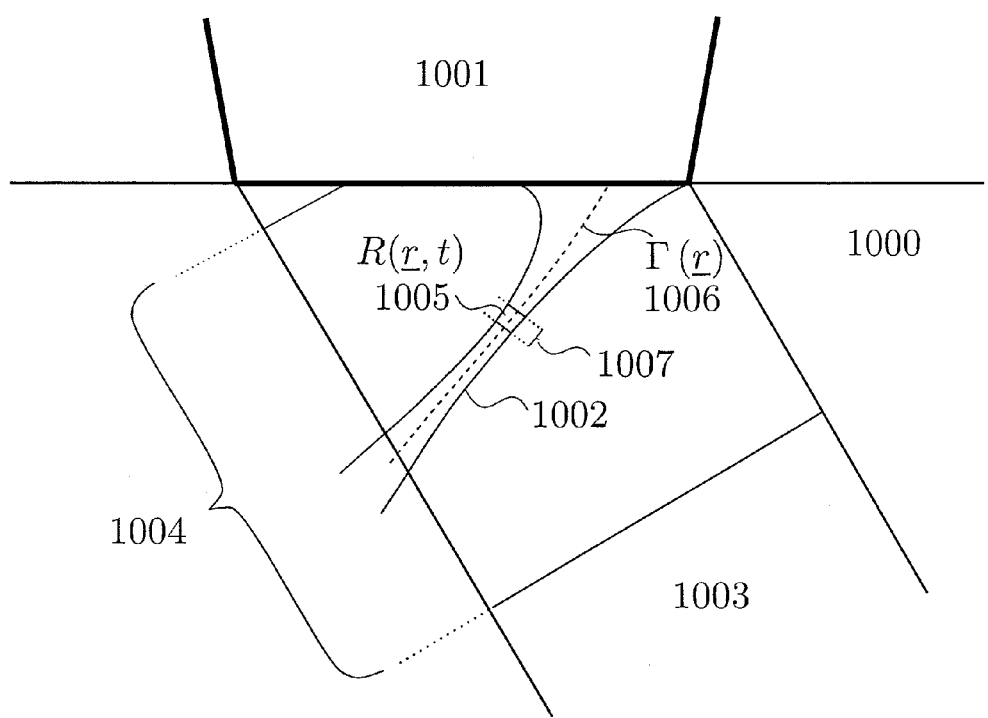
FIG. 10 shows an embodiment where one of the 1$^{st}$ and 2$^{nd}$ transmit beams is a narrow beam.

In FIG. 1*a* is shown a 1$^{st}$ pulsed wave beam 101, bounded by the lines 109 and 110, and a 2$^{nd}$ pulsed wave beam 102, bounded by the lines 111 and 112, where both 1$^{st}$ and 2$^{nd}$ beams are incident onto an object 103. In this example both beams are wide in the azimuth plane, which is the paper plane, but would preferably in this example be narrow in the elevation direction normal to the azimuth plane. An embodiment where one of the beams is narrow where the other beam is wide in the azimuth direction, is shown in FIG. 10. Continuing with FIG. 1, 104 designates a 1$^{st}$ pulsed wave field that propagates along the 1$^{st}$ beam, with a unit normal $n_1(r)$ to the pulsed wave front, where r is the coordinate vector in 3D space of combined azimuth and elevation directions. A 2$^{nd}$ pulsed wave field 105 propagates along the 2$^{nd}$ beam, with a unit normal $n_2(r)$ to the pulsed wave front. The 1$^{st}$ and 2$^{nd}$ pulsed waves have 1$^{st}$ and 2$^{nd}$ center frequencies $\omega_1 = 2\pi f_1$ and $\omega_2 = 2\pi f_2$ and can for example be expressed with the wave fields Pulsed wave 104: $p_1(r,t) = Re\{\tilde{p}_1(r,t)e^{i\omega_1(t-n_1r/c)}\}$ Pulsed wave 105: $p_2(r,t) = Re\{\tilde{p}_2(r,t)e^{i\omega_2(t-n_2r/c)}\}$ (1)

The 1$^{st}$ and 2$^{nd}$ pulsed waves 104 and 105 overlap in the region R(r,t) shown as 106. The overlap region propagates with time along the image or measurement curve Γ(r), indicated as 107. By varying the difference in transmit time between the 1$^{st}$ and 2$^{nd}$ pulsed waves, the measurement or image curve Γ(r) can be moved laterally as indicated by the arrows 108. This movement of Γ(r) allows scanning of the object for imaging, according to preferred embodiments of the invention. With a fixed selection of the 1$^{st}$ (101) and 2$^{nd}$ (102) transmit beams, the end boundaries 113 and 114 of Γ(r) are limited by the beam boundaries 109-112.

In this example the overlap region propagates (moves) along Γ(r) with an efficient propagation velocity $$c_R = \frac{c}{\cos\varphi} = \frac{2c}{|\underline{n}_1(r) + \underline{n}_2(r)|} \quad (2)$$

where c is the wave propagation velocity in the two beams and 2φ is the angle between the two beam normals. This expression is derived with reference to FIG. 1*b*, where 104 and 105 illustrate the 1$^{st}$ and 2$^{nd}$ pulsed wave fronts at time t with the center of the overlap region R(r,t) indicted as 106. After a time Δt, the wave fronts have moved a distance cΔt normal to the wave fronts, i.e. along the normals $n_1$ and $n_2$, to the wave fronts 124 and 125 for the 1$^{st}$ and 2$^{nd}$ pulsed waves respectively. The center of the overlap region has now propagated to 126 and the length of the propagation line 127 is cΔt/cos φ where 2φ is the angle between the normals to the wave fronts 124 and 125. The detail illustrated at 120 shows that $|n_1(r) + n_2(r)| = 2\cos\varphi$, which proves Eq. (2).

When the nonlinear material parameters can be approximated to 2$^{nd}$ order in the wave fields, we can for example for ultrasonic pressure waves formulate a wave equation that includes nonlinear forward propagation and scattering phenomena as $$\underbrace{\nabla^2 p(\underline{r},t) - \frac{1}{c_0^2(\underline{r})}\frac{\partial^2 p(\underline{r},t)}{\partial t^2}}_{(1)Linear\ propagation} +$$

$$\underbrace{\frac{\beta_p(\underline{r})}{c_0^2(\underline{r})}\frac{\partial^2 p(\underline{r},t)^2}{\partial t^2}}_{(2)Nonlinear\ propagation} \underbrace{-h_p(\underline{r},t) \otimes_t \frac{1}{c_0^2}\frac{\partial^2 p(\underline{r},t)}{\partial t^2}}_{(3)Absorption} =$$

$$\underbrace{\frac{\sigma_l(\underline{r})}{c_0^2(\underline{r})}\frac{\partial^2 p(\underline{r},t)}{\partial t^2} + \nabla(\gamma(\underline{r})\nabla p(\underline{r},t))}_{(4)Linear\ scattering\ source\ terms} - \underbrace{\frac{\sigma_n(\underline{r})}{c_0^2(\underline{r})}\frac{\partial^2 p(\underline{r},t)^2}{\partial t^2}}_{(5)Nonlinear\ scattering\ source\ term}$$

(3)

where p(r,t) is the pulsed wave field variable which for ultrasonic compression waves is the acoustic pressure. $c_0(r)$ is the linear wave propagation velocity for low field amplitudes, $\beta_p(r)$ is a nonlinear propagation parameter, $h_p(r,t)$ is a convolution kernel that represents absorption of wave energy to heat, $\sigma_l(r)$ and $\gamma(r)$ are linear scattering parameters, and $\sigma_n(r)$ is a nonlinear scattering parameter. The left side propagation parameters vary with r on a scale>approximately the wavelength, while the right side scattering parameters vary with r on a scale<approximately the wave length. A similar equation for electromagnetic waves can be formulated that represents similar nonlinear propagation and scattering phenomena for the EM waves.

Spatial variations in the linear material parameters produce linear scattering of both waves $p_1(r,t)$ and $p_2(r,t)$ independent of each other along the whole propagation path of the waves, and produce scattered waves with frequencies within the band of the incident waves. For materials with adequately high nonlinearity in the material parameters relative to the amplitude of the field parameters found in the wave, the nonlinearity affects both the propagation and scattering of the wave.

The different terms of Eq. (3) have different effects on the wave propagation and scattering: The linear propagation terms (1) guide the forward spatial propagation of the incident wave without addition of new frequency components. The linear scattering source terms (4) produce local scattering of the incident wave without addition of new frequency components, i.e. the linearly scattered wave has the same frequency components as the incident wave. However, for materials with adequately high nonlinearity in the material parameters relative to the wave field amplitude, the nonlinearity affects both the propagation and local scattering of the wave. A slowly varying (close to constant on scale>~wave length) of the nonlinear material parameters will provide a nonlinear forward propagation distortion of the incident waves that accumulates/increases in amplitude with propagation distance through term (2). A rapid variation (on scale<~wavelength) of the nonlinear material parameters produces a local nonlinear scattering of the incident waves through term (5).

The nonlinear propagation (2) and scattering (5) phenomena are in this approximation ($2^{nd}$ order) both proportional to $p(r,t)^2$. For a wave that is a sum of two components $p=p_1+p_2$ the nonlinear propagation and scattering are both given by $$\sim p(r, t)^2 = (p_1(r, t) + p_2(r, t))^2 \quad (4)$$

$$= \underbrace{p_1(r, t)^2}_{\text{nonlin self distortion}} + \underbrace{2p_1(r, t)p_2(r, t)}_{\text{nonlin interaction}} + \underbrace{p_2(r, t)^2}_{\text{nonlin self distortion}}$$

A multiplication of two functions in the temporal domain produces a convolution of the functions temporal Fourier transforms (i.e. temporal frequency spectra) in the temporal frequency domain. This convolution introduces frequency components in the product of the functions that are sums and differences of the frequency components of the factors of the multiplication. We define two groups of nonlinear distortion terms in the scattered signal:

Group A originates from the linear scattering, i.e. term (4) of Eq. (3), of the forward accumulative nonlinear propagation distortion components in the incident wave, i.e. combination of term (2) and term (4) in Eq. (3), and Group B originates directly in the local nonlinear scattering, i.e. term (5), of the original frequency components in the incident wave with linear propagation, i.e. interaction between term (1) and term (5).

There is also a Group C found as local nonlinear scattering from term (5) of the forward accumulative nonlinear propagation distortion components in the incident wave, i.e. interaction between term (2) and term (5) in Eq. (3), but typical nonlinear material parameters are so low that this group is negligible.

For the self-distortion terms the convolution between the incident spectra introduces harmonic bands where sum frequencies gives bands around a whole number times the incident frequencies, and sub harmonic bands where the difference frequencies gives a band below the incident frequency determined by the envelopes of the incident pulses, both for Group A and B of scattered signals. For the nonlinear self distortion the nonlinear propagation distortion accumulates over the whole propagation path of the incident beams, and the Group A scattered components are therefore generally much stronger than the Group B components that originates in the local scattering, except in some situations of resonant scattering like with ultrasound contrast agent micro bubbles, or optical fluorescence and two-photon scattering, where the self distortion scattering (Group B) is comparably high. The Group A and Group B components of the nonlinear self distortion also have the same signature, so that it is generally difficult to extract the locally scattered nonlinear self-distortion components (group B) except in some situations of resonant scattering.

The nonlinear interaction term, as opposed to the self distortion terms, is only found in the overlap region R(r,t) between the two incident pulsed waves along the measurement or image curve Γ(r). The forward propagation distance to provide a nonlinear interaction forward propagation distortion of the incident wave can therefore be made much shorter than for the nonlinear self distortion terms, limiting the amplitude of the Group A components. One generally wants to design the overlap region R(r,t) to be sufficiently small so that the amplitude of the Group B components is high compared to the Group A components, which allows us to measure or image the local nonlinear interaction scattering (Group B).

Figure 2A:
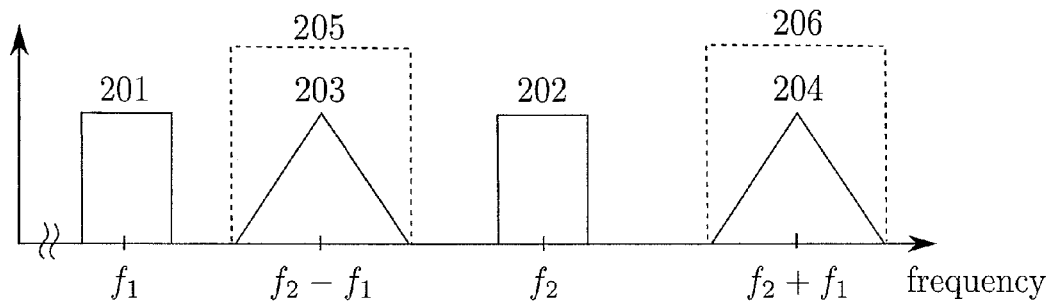
FIGS. 2*a* and 2*b* illustrates formation of sum and difference frequency bands of the incident 1$^{st}$ and 2$^{nd}$ transmitted temporal frequency bands, and extraction of the nonlinear interaction scattering signal through filtering in the temporal frequency domain.

This phenomenon is used in a $1^{st}$ embodiment of the invention to obtain the nonlinear interaction components of the scattered waves for the measurement or image curve Γ(r), discussed in relation to FIG. 2a. In this Figure 201 and 202 show temporal frequency spectra of the incident pulsed waves 104 and 105, where $f_1 \approx f_2/3$ for illustration purposes. The product of the two wave fields in the interaction term is equivalent to a convolution in the frequency domain, that produces frequency bands in the non-linear interaction terms (Eq. (4)) at sum and difference frequencies of the incident bands. The temporal frequency spectra of the nonlinear interaction term~$2p_1(r,t) p_2(r,t)$ is then the convolution of 201 and 202 shown as 203 and 204. The Group A and Group B components provide similar signatures of the scattered signals and the magnitude of the Group A components hence provides a lower limit for the sensitivity to local nonlinear interaction scattering (Group B). However, with adequately small size of the overlap region R(r,t) there are many situations where the Group A components are weak compared to the local nonlinear interaction scattering components (Group B).

Receiving or measuring the nonlinear interaction scattered signal from R(r,t) along Γ(r), provides a fundamental measurement or image signal along the measurement or image curve Γ(r). Pick-up of the scattered wave with a spatial resolution along Γ(r) can for example be obtained with a time sensitive detector system as the scattering from R(r,t) along Γ(r) occurs with an accumulative time lag from the top point 113 to the bottom point 114 of Γ(r) in FIG. 1a. Receiving or measuring the nonlinear interaction scattered signal with spatial resolution along Γ(r) can also be obtained with a focused detection system that selectively observes focused regions along Γ(r), for example a camera system (e.g. CCD camera) or a dynamically focused array of receiver elements (e.g. using beamforming techniques), or one can favorably for improved spatial and contrast resolution combine the time lag and focused detection/pick-up systems, for example as described in FIGS. 7-11.

When the incident frequency bands 201 and 202 are so arranged that there is no overlap with the nonlinear interaction scattered bands 203 and 204, as shown in FIG. 2a, one can suppress linearly scattered bands 201 and 202 to extract the nonlinear interaction scattered components by band pass filtering the receive signal in the temporal frequency domain, for example with the band pass filters 205 and 206 illustrated in FIG. 2*a*. To increase sensitivity to the nonlinear interaction scattering one can merge the outputs of both bands 203 and 204 in the forming of image signals.

The measurement or image curve $\Gamma(r)$ can be scanned laterally by for example varying the timing between the transmit of the $1^{st}$ and $2^{nd}$ pulsed waves, or the directions of at least one of the $1^{st}$ and $2^{nd}$ beams, or a combination of these, and through this scanning one can obtain image data for a set of multiple measurement or image curves $\Gamma_k(r)$, k=1 ... K that are distributed in two or three dimensions in the object to form two-dimensional or three-dimensional images of the object. Image data between these measurement or image curves $\Gamma_k(r)$ can be obtained through interpolation when the distance between curves is sufficiently short in relation to the fundamental spatial resolution of the system given by the details of R(r,t) combined with the spatial resolution of a focused receiver system, according to known methods.

Movement or displacement of the scatterers can be measured by using at least two transmit events with the same time relation between the transmit of the $1^{st}$ and $2^{nd}$ pulsed waves, and the same directions of the $1^{st}$ and $2^{nd}$ beams, so that the overlap region from the $2^{nd}$ transmit event propagates along the same measurement or image curve $\Gamma(r)$ as for the $1^{st}$ transmit event. Movements of the scatterers between the two transmit events will then be found as the change in the phase and the envelope between the received signals from the two transmit events. The change in phase is often referred to as the Doppler effect and gives the most sensitive detection of movements. It only shows the component of movement or displacement along the gradient of the sum phase of the two incident waves, which in the example of FIG. 1*a*, *b* is along $n_1+n_2$. The change in the envelope is found as a change in speckle in an image obtained with lateral scanning of the measurement or image curve, and analysis of changing of speckle pattern between two images of a region (i.e. at least two transmit events along each $\Gamma(r)$), will give the complete displacement vector for 3D imaging, and the component of the displacement vector in the plane or on the surface for 2D imaging.

In many situations one can get interference bands with the nonlinearly scattered bands 203 and 204 from harmonic self distortion components of the incident bands 201 or 202, either through forward propagation distortion or local nonlinear scattering, or a combination of these, reducing the sensitivity to the nonlinear interaction scattering. One way to improve this situation is to transmit two pulse sets, changing the polarity of one of $p_1$ and $p_2$ for the $2^{nd}$ set. The polarity of the scattered nonlinear interaction term~$p_1 p_2$ will then change polarity for the $2^{nd}$ transmit, while the even ($2^{nd}$, $4^{th}$, ...) harmonic self-distortion components~$p_1^2$ and $p_2^2$, for both Group A and Group B scattering, will not change polarity. Hence, subtracting the receive signals from these two transmit events in the method often referred to as pulse inversion, will then enhance the nonlinear interaction scattering term above even harmonic components of the incident bands. Linear scattering components of the incident bands 201 and 202 can be suppressed by filtering in the time domain.

In the example in FIG. 2*a* it is mainly the harmonic components of the incident band 201 that interferes with the nonlinear interaction spectra, and one can then favorably change the sign of $p_2$ in the $2^{nd}$ transmit event, where subtraction of the received signals will then cancel 201 and all harmonics thereof, while retrieving the nonlinear interaction spectra 203 and 204. The incident spectrum 202 can then be suppressed through filtering. In this example one can also suppress the interference from the incident spectrum 201 and harmonic components thereof by transmitting only the $1^{st}$ pulse $p_1$ in a $2^{nd}$ transmit event, and subtracting the received signal from this $2^{nd}$ transmit event band pass filtered with 205 (and optionally 206) from the received signal from the $1^{st}$ transmit event that includes $p_2$ also band pass filtered with 205 (and optionally 206). Neglecting the $2^{nd}$ transmit band in the $2^{nd}$ transmit event reduces the exposure of the object to waves and reduces heating and other potential sources of object stress or damage. Variations of these schemes can be developed by anyone skilled in the art.

Figure 2B:
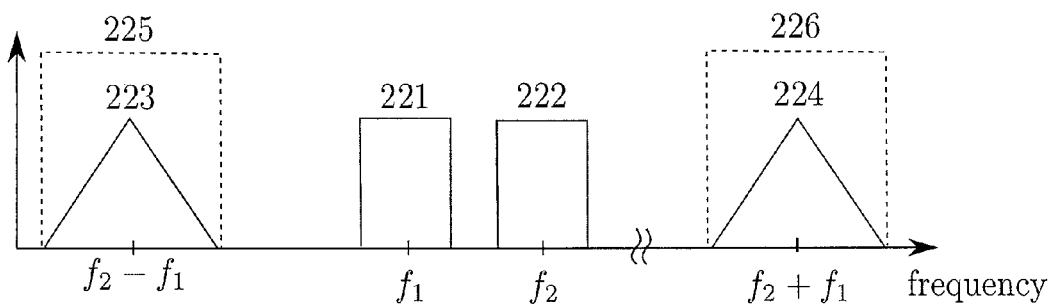

FIG. 2*b* shows a modification of the spectra in FIG. 2*a* where the transmitted spectra 221 around $f_1$ and 222 around $f_2$ are now so close that the nonlinear interaction convolved spectrum 223 around $f_2-f_1$ is found at frequencies well below the lower transmit band 221, while the nonlinear interaction convolved spectrum 224 around $f_1+f_2$ is found at frequencies close to twice the upper transmit band 222 frequency (i.e. close to $2^{nd}$ harmonic components of 222). The low frequency interaction scattered band 223 can be separated through band pass filtering with the filter 225 and the high frequency interaction scattered band 224 can be separated with the filter 226. One can also use a pulse inversion technique where for example the polarity of the high frequency transmit spectrum 222 is changed in the $2^{nd}$ transmit event. Band stop filtering around $f_2$ can then be used to remove the spectrum of 222 in the received signal. The reduced frequencies of the low non-linear interaction scattering band 223 provide low absorption of this band on receive and increase sensitivity to the nonlinear interaction scattering. Variations of these schemes can be developed by anyone skilled in the art.

To further improve sensitivity for the nonlinear interaction term~$2p_1(r,t) p_2(r,t)$ at large depths in the object, it is useful to select the low frequency (LF) $f_1$ as low as possible for low absorption, but adequately high to get an adequately collimated beam. The high frequency (HF) $f_2$ is selected high to get adequate spatial resolution for the given imaging depth into the object, for example with the frequency ratio $f_1:f_2 \sim 1.5\text{-}1.30$. In particularly preferred embodiments the ratio is in the order of 1:10. For ultrasound imaging one could for example in one application choose $f_2 \sim 10$ MHz to image down to 40 mm with $f_1 \sim 1$ MHz, or in another application choose $f_2 \sim 3.5$ MHz to image down to 150 mm with $f_1 \sim 0.3$ MHz, i.e. a frequency ratio of about 1:10. Similar examples are found for scattering of EM waves.

Figure 2C:
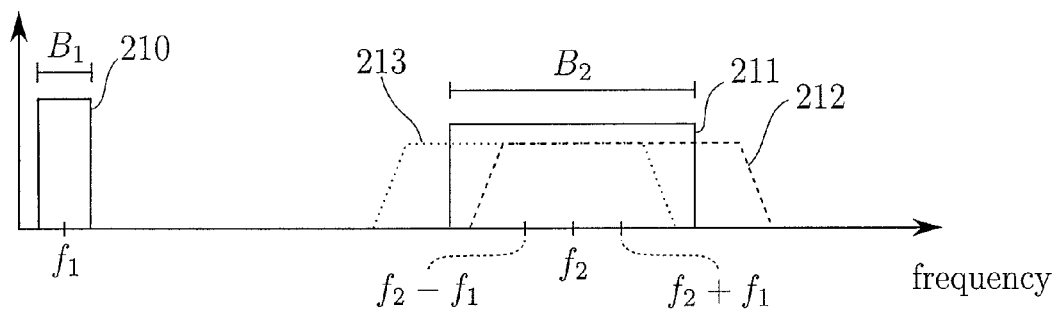
FIG. 2*c* illustrates formation of sum and difference frequency bands of the incident 1$^{st}$ and 2$^{nd}$ transmitted temporal frequency bands when the 1$^{st}$ center frequency is less than the temporal frequency bandwidth of the 2$^{nd}$ transmitted wave.

In FIG. 2*c* it is for this situation shown an example incident LF spectrum 210 for $p_1$ and an example incident HF spectrum 211 for $p_2$, with the convolved sum and difference frequency spectra as 212 and 213 from the nonlinear interaction product of $p_1$ and $p_2$ in Eq. (4). The center frequencies of 212 and 213 are $f_2+f_1$ and $f_2-f_1$, respectively. The sum and difference frequency spectra 212 and 213 overlap in this example with each other and the incident HF spectrum 211. In the convolution between the frequency spectra 210 and 211, one gets averaging of neighboring frequency components of the HF spectrum 211 over the bandwidth $B_1$ of the LF spectrum 210. This averaging also produces the skewed edges of the spectra 212 and 213. When the HF pulse is much shorter than the LF pulse, the frequency resolution in the HF spectrum 211 is wider than the bandwidth $B_1$ of 210 and this averaging has negligible effect on the sum and difference spectra 212 and 213, and allows the assumption of a continuous LF oscillation, i.e. infinitely long LF pulse) in the analysis in Eqs. (5-9).

FIG. 2*c* shows an example where there is considerable overlap between the sum and difference spectra 212 and 213 and the original HF spectrum 211. This gives opportunities for signal processing that suppresses Group A scattering components (defined above) in the received signal. This suppression hence improves sensitivity to the Group B scattering components, and is discussed further below. However, with small size of the overlap region, the Group A components have often so low amplitude that one obtains adequate sensitivity to the Group B scattered components in many situations without added suppression of Group A components. One can in this situation retrieve the Group B components from the received signal through the pulse inversion technique by using two transmit events of combined LF and HF pulse transmits, changing the polarity of the LF pulse $p_1$ for the $2^{nd}$ transmit event. The polarity of the scattered nonlinear interaction term (212 and 213)~$p_1 p_2$ will then change polarity for the $2^{nd}$ transmit event, while the linearly scattered HF signal (211) does not. Subtracting the received signals from the two transmit events will then strongly suppress the linearly scattered HF signal (211) and extract the nonlinearly scattered HF signal (212 and 213) from R(r,t). Even harmonic components of the LF pulse will also be suppressed in this process.

Frequency components from the LF signal, both fundamental and harmonic components, can be suppressed in the receive signal through filtering in the temporal frequency domain, and subtracting the filtered receive signal from the two transmit events will highly suppress linearly scattered frequency components from the high frequency band 211 and extract the nonlinear interaction scattered frequency bands 212 and 213 for further processing to form image signals along the measurement or image curve $\Gamma(r)$. One can also suppress scattered signals from the $1^{st}$ frequency band (i.e. LF band) and harmonic components thereof by using a $1^{st}$ transmit event where only the $1^{st}$ pulsed wave (i.e. LF) is transmitted, and the received signal from this $1^{st}$ transmit event is subtracted from the received signals from a $2^{nd}$ transmit event where both the $1^{st}$ and $2^{nd}$ pulsed waves are transmitted. One then needs separate $1^{st}$ and $2^{nd}$ transmit events for each of the two polarities of the LF pulse $p_1$ for the pulse inversion extraction of the local nonlinear interaction scattering signal, which means in total 4 transmit events to extract the nonlinear interaction scattering signal.

The local nonlinear interaction scattering signal can also be extracted by transmitting a $1^{st}$ event where $p_1$ is zero while $p_2$ is non-zero, followed by a $2^{nd}$ transmit event with the same $p_2$ and nonzero $p_1$ and subtracting the received signal for the $1^{st}$ transmit event from the received signal for the $2^{nd}$ transmit event. One can even vary the transmit amplitude of $p_2$ between the two events, with a similar scaling of the received signal from one of the events to minimize any remnants of the linearly scattered signal from $p_2$ after the subtraction. One could also adjust a scaling variable for one of the received signals, for both manual and automatic adjustments to minimize the remaining components of 210 and 211 in the resulting signal, to compensate for variations in transmit and receive channels between the 2 transmit events. This can also be done for the pulse inversion transmits. When the object is moving, one can use more than two transmit events and estimate and compensate for Doppler shifts in the received signal according to methods known by anyone skilled in the art. Based on the above discussion a variety of schemes can hence be applied by anyone skilled in the art to extract the local nonlinear interaction scattered signal components, Group B, from the received signal(s).

When the scatterers move between transmit events, the original spectra will leak through in the combination of signals from two transmit events discussed for FIG. 2a-c above, to cancel unwanted components. To differentiate between variations in the transmitted pulsed waves (e.g. polarity and amplitude) described above, and displacement of scatterers between the transmit events, one must use an increased number of transmit events to also estimate the scatterer displacement, where the overlap region propagates along the same transmit measurement or image curve. This allows combined estimation of scatterer displacement and suppression of the unwanted components, according to known methods.

Figure 5A:
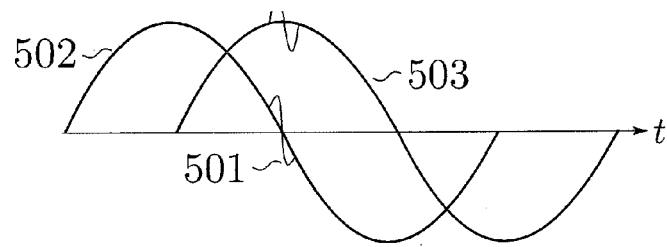
FIG. 5 illustrates how a change in transmit time difference between 1$^{st}$ and 2$^{nd}$ transmit times can be used to move sensitivity sub-regions to previous regions of low sensitivity.

As presented above, the components of the linear scattering from the forward propagation distortion can be further suppressed when the pulse length $T_{p2}$ of the high frequency (HF—$2^{nd}$ pulsed wave) is shorter than the low frequency (LF—$1^{st}$ pulsed wave) temporal period $T_1$, particularly shorter than $T_1/2$. An example of this situation is shown in FIG. 5a where the HF pulse length $T_{p2} \ll T_1/2 = 1/2f_1$. For the HF pulse 504 that rides on the crest of the LF oscillation 503 the nonlinear propagation term (2) of Eq. (3) produces a change of the propagation velocity observed by the HF pulse that produces an added nonlinear propagation delay for the HF pulse. For studies of this we notice that $|2\beta_p(r)p_1(r,t)| = |x| \ll 1$ which allows the approximation $1-x \approx 1/(1+x)$ for $|x| \ll 1$ and the propagation terms of the left side of Eq. (3) can be approximated for the HF pulse including the interaction with the LF pulse as $$\underbrace{\nabla^2 p_2(r,t) - \frac{1}{c_0^2(r)} \frac{\partial^2 p_2(r,t)}{\partial t^2}}_{(1) \text{Linear propagation}} + \underbrace{\frac{2\beta_p(r)p_1(r,t)}{c_0^2(r)} \frac{\partial^2 p_2(r,t)}{\partial t^2}}_{(2) \text{Nonlinear propagation}} \approx \quad (5)$$

$$\nabla^2 p_2(r,t) - \frac{1}{c_0^2(r)(1+2\beta_p(r)p_1(r,t))} \frac{\partial^2 p_2(r,t)}{\partial t^2}$$

The numerator in front of the temporal derivative in this propagation operator is the square propagation velocity, and we hence see that the LF pulse $p_1$ modifies the propagation velocity for the co-propagating HF pulse $p_2$ as $$c(r,p_1) = \sqrt{c_0^2(r)(1+2\beta_p(r)p_1)} \approx c_0(r)(1+\beta_p(r)p_1) \quad (6)$$

where $p_1$ is the actual LF field variable along the co-propagating HF pulse. The propagation time down to a depth r of the HF pulse is hence $$t(r) = \int_0^r \frac{ds}{c(r,p_1)} \approx \int_0^r \frac{ds}{c_0} - \int_0^r \frac{ds}{c_0} \beta_p(s)p_1(s) = t_0(r) + \tau(r) \quad (7)$$

$$t_0(r) = \int_0^r \frac{ds}{c_0}$$

$$\tau(r) = -\int_0^r \frac{ds}{c_0} \beta_p(s)p_1(s)$$

where $p_1(s)$ is the average LF field along the co-propagating HF pulse as a function of depth the integration variable s is the location where the LAF field takes this average value. In many practical situations this is close to the center of gravity of the propagating HF pulse and $t_0(r)$ is the propagation lag found for zero LF pulse down to the range r along the propagation of the HF pulse and $\tau(r)$ is the nonlinear propagation delay down to the depth r. For $\beta_p p_1 > 0$ the LF pulse produces an increase in the propagation velocity with an advancement of the HF pulse (i.e. negative nonlinear propagation delay) while for $\beta_p p_1 < 0$ the LF pulse produces a decrease in the propagation velocity with a true delay of the HF pulse (i.e. a positive nonlinear propagation delay).

The nonlinear scattering term (5) in Eq. (3) can for the nonlinear interaction term be approximated within the same regime as $$\underbrace{\frac{\sigma_n(r)}{c_0^2(r)} \frac{\partial^2 p(r,t)^2}{\partial t^2}}_{(5)\text{Nonlinear scatting source term}} \approx \frac{2\sigma_n(r)p_1(r,t)}{c_0^2(r)} \frac{\partial^2 p_2(r,t)}{\partial t^2} \quad (8)$$

We hence see that the effect of the LF pulse on the Group B scattering components is in this case ($T_{p2} \ll T_1/2$) an amplitude modulation of the scattered wave, proportional to $2\sigma_n p_1$. There is hence in this situation a large difference between the signatures of Group A and Group B scattered components, which can be used to further suppress the Group A components in the received signal through signal processing on the received signal.

As an example of such a processing we assume that the amplitude of the LF pulse drops so much in the 1$^{st}$ scattering, that the nonlinear interaction is negligible after the 1$^{st}$ scattering. The Group A and Group B scattered components then get the same nonlinear propagation delay and we can use the following model for the nonlinear interaction received signals from two transmit events with opposite polarity of the LF pulse $$y_+(t) = a(t - \tau(t)) + b(t - \tau(t)) \quad (9)$$

$$y_-(t) = \underbrace{a(t + \tau(t))}_{\text{Class A}} - \underbrace{b(t + \tau(t))}_{\text{Class B}}$$

where t is the arrival time of scattered signal from a depth r, and a(t) originates from Class A scattering and b(t) originates from Class B scattering. There exist many methods in the literature to estimate delays between signals, and an estimate $\hat{b}(t)$ of the Group B signal can be obtained by estimating the nonlinear propagation delay $\hat{\tau}(t)$ as half the delay between $y_+$ and $y_-$ and correcting for the estimated delay and combine the signals as $$\hat{b}(t) = \frac{1}{2}\{y_+(t+\hat{\tau}(t)) - y_-(t-\hat{\tau}(t))\} \quad (10)$$

More elaborate estimation schemes can be developed by anyone skilled in the art according to known methods.

The variation of the LF field variable around its average value along the HF pulse, results in a propagation velocity, Eq. (6), that varies along the HF pulse and produces a forward propagation distortion of the HF pulse that accumulates with propagation distance. For the HF pulse 504 that is located at the crest of the LF pulse 503, it is the curvature of the LF oscillation that produces the distortion, where the front and the tail of the LF pulse gets the same propagation velocity, while the center of the HF pulse gets a higher propagation velocity for $\beta_p p_1 > 0$ and a lower propagation velocity for $\beta_p p_1 < 0$ at the center of the co-propagating HF pulse. For the HF pulse 501 that propagates around the zero-crossing of the LF pulse 502 the average LF field variable along the HF pulse is zero and the nonlinear propagation delay of the HF pulse is zero. However, there is in this situation a strong gradient of the LF pulse oscillation along the HF pulse that produces a change in length of the HF pulse (pulse length compression or expansion depending of the sign of $\beta_p \dot{p}_1$).

The variation of the LF field variables along the HF pulse will also produce a distortion in the local nonlinear scattering. The difference between Group A and B can then be summarized as Group A, Forward Nonlinear Interaction Propagation Distortion:
AI: The average LF pressure along the co-propagating HF pulse produces a nonlinear propagation delay of the HF pulse, said delay accumulates with propagation distance of the HF pulse in the interaction region.
AII: A variation of the LF pressure around its average value along the co-propagating HF pulse produces a nonlinear propagation pulse form distortion of the HF pulse, said distortion accumulates with propagation distance of the HF pulse in the interaction region.
Group B, Local Nonlinear Interaction Scattering Distortion:
BI: The average LF pressure along the co-propagating HF pulse produces a nonlinear amplitude modulation of the locally scattered HF signal proportional to the local average of the LF field variables along the HF pulse.
BII: A variation of the LF pressure around its average value along the co-propagating HF pulse produces a pulse form distortion of the locally scattered HF signal given by the local variation of the LF field variables along the HF pulse.

The pulse form distortion under BII is different from that under AII, as under AII the net distortion is given by an accumulation of a local distortion along the propagation path of the HF pulse where the local distortion varies along the propagation path, and even oscillates positive and negative as discussed below, while under BII the distortion is given by the local variation of the LF pulse field variables along the HF pulse at the local scatterer.

The pulse form distortion can be modeled by operators on the Group A and B scattered components as $$y_+(t) = H_+\{a(t - \tau(t))\} + H_{b+}\{b(t - \tau(t))\} \quad (11)$$

$$y_-(t) = \underbrace{H_-\{a(t + \tau(t))\}}_{\text{Class A}} - \underbrace{H_{b-}\{b(t + \tau(t))\}}_{\text{Class B}} \quad a)$$

$$H_\pm\{a(t \mp \tau(t))\} = \int dt_1 h_\pm(t - t_1, t_1) a(t_1 \mp \tau(t_1))$$

$$H_{b\pm}\{a(t \mp \tau(t))\} = \int dt_1 h_{b\pm}(t - t_1, t_1) b(t_1 \mp \tau(t_1)) \quad b)$$

where $y_+$ and $y_-$ are the received signals from two transmit events with opposite polarities of the transmitted LF pulse. $H_q$, $q = \pm$ and $b\pm$ are operators that represents the pulse form distortion. For moderate pulse form distortion these operators can be modeled by the linear filters in Eq. (11b) with impulse responses $h_q$, $q = \pm$ and $b\pm$. An estimate of the pulse form distortion can for example be obtained from an estimate of $\beta_p(r)p_1(r)$ in the material, and computer simulation of nonlinear wave propagation of co-propagating pulses in the material. An estimate of $\beta_p(r)p_1(r)$ can for example be obtained from Eq. (7) as the spatial gradient of the estimated nonlinear propagation delay.

When estimates of the distortion operators are found and have inverses, we can obtain an estimate of the Group B scattered signal with strong suppression of Group A components as $$\hat{b}(t) = \frac{1}{2}\{H_+^{-1}\{y_+(t+\hat{\tau})\} - H_-^{-1}\{y_-(t-\hat{\tau}(t))\}\} \quad (12)$$

where $H_+^{-1}$ and $H_-^{-1}$ are the inverse or at least approximate inverse of the $H_+$ and $H_-$ operators and represents a correction for the pulse form distortion of $H_+$ and $H_-$. Inverse filters usually exists, at least in approximate form within a limited band of frequencies of b(t), where several methods of inverse filtering are presented in the literature.

For more in depth analysis of the difference in signature of Group A and B scattering in the situation illustrated in FIG.

2c, i.e. $T_{p2} < T_1$, we assume that the LF and HF pulses have the following simple plane wave forms LF pulse: $p_1(r,t) = a_1(r, t-t_1-n_1 r/c) \cos \omega_1(t-t_1-n_1 r/c)$ HF pulse: $p_2(r,t) = p_2(t - n_2 r/c)$ (13)

Across the short HF pulse of temporal pulse length $T_{p2} \ll T_{p1}$, the LF pulse length, we approximate $a_1(r, t-t_1-n_1 r/c) \approx a_1$, i.e. a constant, which is consistent with neglecting the frequency averaging by the incident LF spectrum 210 as discussed in relation to FIG. 2c above. The nonlinear interaction scattering source term then originates from $$2p_1(r,t)p_2(r,t) = 2a_1 \cos \omega_1(t-t_1-n_1 r/c) p_2(t-n_2 r/c) = a_1 (e^{i\omega_1(t-t_1-n_1 r/c)} + e^{-i\omega_1(t-t_1-n_1 r/c)}) p_2(t-n_2 r/c) \quad (14)$$

We introduce the retarded time $\tau = t - n_2 r/c$ for the $2^{nd}$ pulse (HF), which gives $$2p_1(r,\tau)p_2(r,\tau) = a_1 (e^{i\omega_1(\tau-t_1-(n_1-n_2)r/c)} + e^{-i\omega_1(\tau-t_1-(n_1-n_2)r/c)}) p_2(\tau) \quad (15)$$

and evaluate the Fourier transform over $\tau$ as $$F_\tau\{2p_1(r,\tau)p_2(r,\tau)\} = a_1 \begin{pmatrix} e^{-i\omega_1(t_1+(n_1-n_2)r/c)} P_2(\omega-\omega_1) + \\ e^{i\omega_1(t_1+(n_1-n_2)r/c)} P_2(\omega+\omega_1) \end{pmatrix} \quad (16)$$

$$= a_1 \cos\theta(t_1, \underline{r})[P_2(\omega-\omega_1) + P_2(\omega+\omega_1)] - ia_1 \sin\theta(t_1, \underline{r})[P_2(\omega-\omega_1) - P_2(\omega+\omega_1)]$$

where we have defined the phase $\theta(t_1, r) = \omega_1(t_1 + (n_1-n_2)r/c)$ with $\omega = 2\pi f$. We note that $P_2(\omega - \omega_1)$ is 212 and $P_2(\omega + \omega_1)$ is 213 in FIG. 2c. We further note that the pulse length $T_{p2}$ of the HF pulse is related to its bandwidth $B_2$ as $T_{p2} = 1/B_2$. We then have the equivalence $T_{p2} < T_1 = 1/f_1 \Leftrightarrow |B_2| > f_1$. Because the propagation direction of the HF and LF pulses are different, the accumulation of the forward propagation delay and pulse distortion along the HF pulse propagation direction will oscillate around zero with a maximal delay and distortion, and an oscillation in the amplitude of the nonlinear interaction scattered signal with maxima and zeros, depending on the value of $\theta(t_1, r)$. The $1^{st}$ term on the right side, i.e. the sum term of the spectra, has maximum values for $\theta(t_1, r) = m\pi$, $m = 0, \pm 1, \ldots$, where $\cos \theta(t_1, r) = \pm 1$. The $2^{nd}$ term on the right side, i.e. the difference term of the spectra, is zero for these values of $\theta$ where $\sin \theta(t_1, r) = 0$. The sum term is zero for $\theta(t_1, r) = (2m+1)\pi/2$, $m = 0, \pm, \ldots$, where $\cos \theta(t_1, r) = 0$, with maximum for the difference term because $\sin \theta(t_1, r) = \pm 1$ for these values of $\theta$. With strong overlap between the spectra $P_2(\omega - \omega_1)$ and $P_2(\omega + \omega_1)$, the difference term is highly reduced and provides much less propagation distortion and scattering than the sum term.

For $B_2 < f_1$ the spectra $P_2(\omega + \omega_1)$ and $P_2(\omega - \omega_1)$ have minimal overlaps with $P_2(\omega)$, and the sum term $P_2(\omega - \omega_1) + P_2(\omega + \omega_1)$ and the difference term $P_2(\omega - \omega_1) - P_2(\omega + \omega_1)$ produce approximately the same amount of scattering, except that the relative magnitude of the two terms depends on $\theta(t_1, r)$. However, because the HF pulse propagation direction $n_2 \neq n_1 - n_2$, the $\cos \theta(t_1, r)$ and $\sin \theta(t_1, r)$ terms will oscillate with r within R(r,t), and we get a spatial oscillation and approximately equal contribution from the sum and difference terms to the nonlinear interaction term within R(r,t). In this situation the difference in signature between the Group A and Group B terms is low. It is therefore difficult to suppress the Group A terms with signal processing, and the Group A signals hence limit the sensitivity to the Group B signal, i.e. the local nonlinear interaction scattering signal. We therefore must for $B_2 < f_1$ rely on a small overlap region R(r,t) to be able to measure local nonlinear interaction scattering, Group B.

When $B_2$ increases above $f_1$, the spectra $P_2(\omega + \omega_1)$ and $P_2(\omega - \omega_1)$ starts to overlap with $P_2(\omega)$ in FIG. 2c, and further when $B_2$ increases above $2f_1$, i.e. $T_{p2} < T_1/2$, the spectra $P_2(\omega + \omega_1)$ and $P_2(\omega - \omega_1)$ start to overlap. For further analysis with strongly overlapping spectra, it is useful to rewrite Eq. (16) as $$F_\tau\{2p_1(r,\tau)p_2(r,\tau)\} = 2a_1 \cos \theta(t_1, r) P_2(\omega) + a_1 \cos \theta(t_1, r)[P_2(\omega-\omega_1) + P_2(\omega+\omega_1) - 2P_2(\omega)] - ia_1 \sin \theta(t_1, r)[P_2(\omega-\omega_1) - P_2(\omega+\omega_1)] \quad (17)$$

The $1^{st}$ term on the right side produces Group AI (nonlinear propagation delay) of the forward propagation distortion with linear scattering, and Group BI amplitude modulation with $a_1$ of the local nonlinear interaction scattering. The $2^{nd}$ term produces a pulse form distortion that is related to the curvature of the LF pulse along the HF pulse, both in the forward propagation distortion, Group AII, and the local nonlinear scattering Group BII. The $3^{rd}$ term produces a pulse form distortion that is related to the gradient of the LF pulse along the HF pulse, both in the forward propagation distortion, Group AII, and the local nonlinear scattering Group BII. With strong overlap between the spectra $P_2(\omega - \omega_1)$ and $P_2(\omega + \omega_1)$, i.e. $B_2 \gg 2f_1 \Leftrightarrow T_{p2} \ll T_1/2$, the $2^{nd}$ and $3^{rd}$ term (pulse form distortion AII and BII) is highly reduced compared to the $1^{st}$ term (propagation delay for Group AI and amplitude modulation of the scattering for Group BI).

There is hence for this situation ($T_{p2} < T_1/2$ for FIG. 2c) a strong difference in signature between Group B, the local nonlinear interaction scattered signal from R(r,t), and Group A, the signal that arises from linear scattering of the accumulative nonlinear interaction propagation distortion components within R(r,t). This difference in signature is used in the signal processing described by Eqs. (10, 12) to suppress the Group A components in the received signal and increase the sensitivity to the local nonlinear interaction scattered signal, Group B, from R(r,t), compared to the situation with transmitted waves as exemplified in FIGS. 2a and 2b where $T_{p2} > T_1$.

To extract the nonlinear interaction scattered signal one can use two transmit events of combined LF and HF pulse transmits, changing the polarity of the LF pulse $p_1$ for the $2^{nd}$ transmit event, as discussed in relation to FIG. 2c above. However, before subtracting the received signals one corrects one or both of the receive signals with one or both of a delay and pulse form correction, for example in a correction filter, before the signals are subtracted. The correction filter then produces at least one of i) a delay correction that compensates for the effect of the nonlinear interaction propagation delay (AI above), and ii) a pulse form distortion correction that compensates for the nonlinear interaction pulse form propagation distortion (AII above) in the linearly scattered received signal.

Figure 3A:
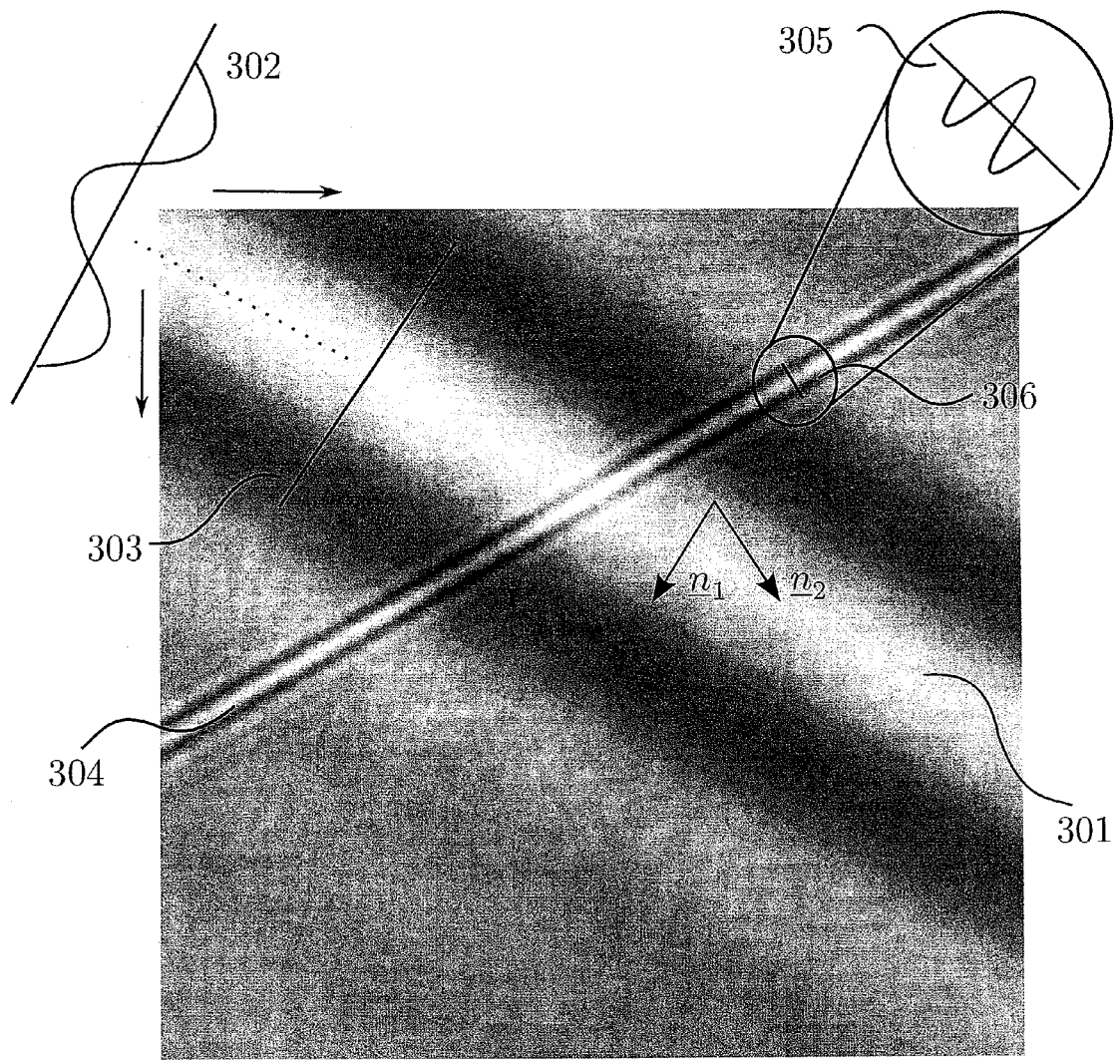
FIG. 3 illustrates how the nonlinear interaction source term breaks up into sub-regions when the frequency of one pulse is much lower than the bandwidth of the other pulse.
Figure 3A:
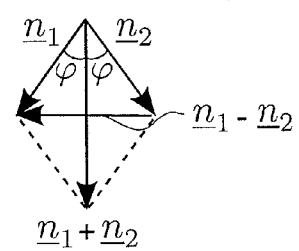
Figure 3B:
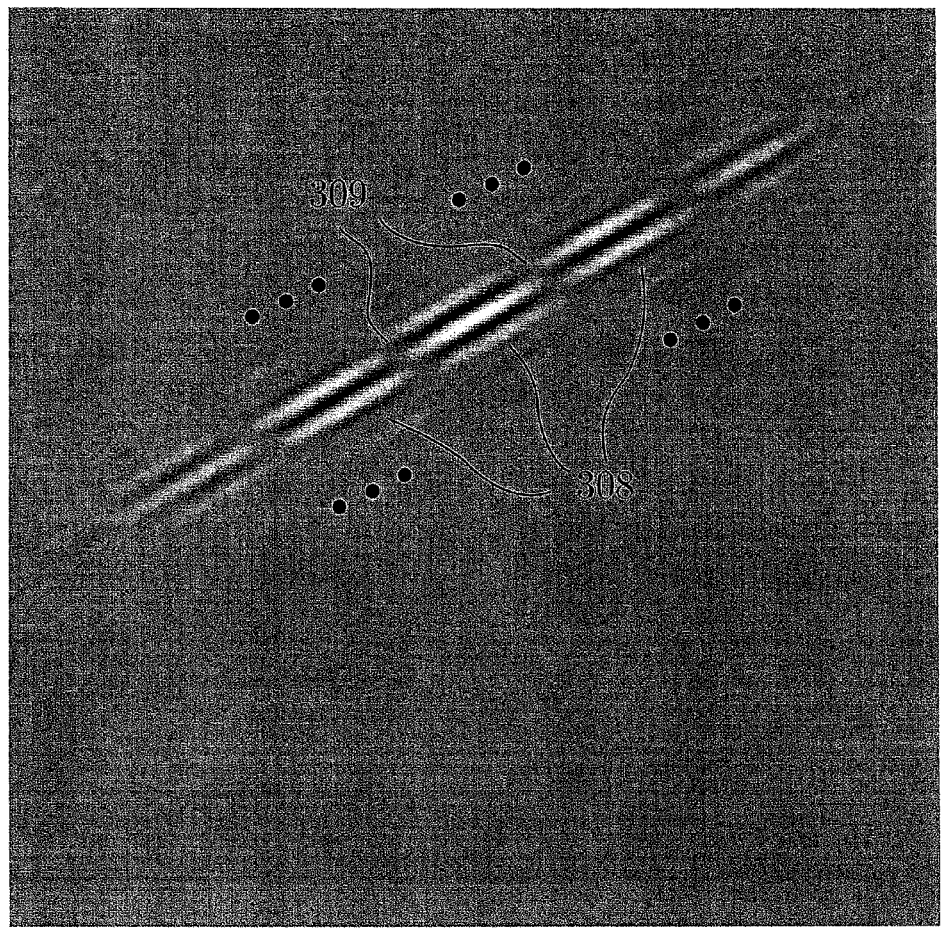
Figure 3B:
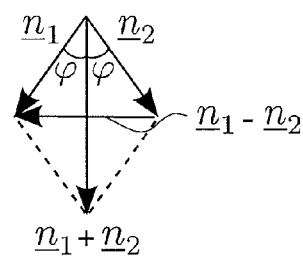

When the HF pulse bandwidth is much larger than the LF (e.g. $B_2 \sim 5f_1$) the overlap region breaks up into sub-regions. For better grasp of this phenomenon we refer to FIG. 3, where 301 in FIG. 3a illustrates in a grey-scale plot the pulse oscillations of an example LF pulse wave field (104) in space at a fixed time as it propagates in the direction of $n_1$. 302 illustrates the spatial oscillation variation of the LF pulse along the line 303. 304 illustrates in a grey-scale plot the pulse oscillations of an example HF pulse wave field (105) in space at a fixed time as it propagates in the direction of $n_2$. 305 is a magnified illustration of the spatial variation of the HF pulse along the line 306. FIG. 3b shows the nonlinear interaction source term $2p_1(r,t)p_2(r,t)$, i.e. the product of the pulses in FIG. 3a. We see that we get high values of the source term for high values (both positive and negative) of the LF oscillation, and with low values in the source term around zeros of the LF oscillation. This produces the nonlinear interaction source term sub-regions 308 with low value sub-regions 309 of the nonlinear interaction source term in between.

The nonlinear interaction sub-regions 308 propagate in the direction of $n_1+n_2$. We note that the phase $\theta(t_1,r)=\omega_1(t_1+(n_1-n_2)r/c)$ in Eq. (8,9) depends on the component of r along $(n_1-n_2)$ and as $(n_1-n_2)(n_1+n_2)=n_1^2-n_2^2=0$ we see that $\theta(t_1,r)$ is constant in the propagation direction of the non-linear interaction sub-regions. A change in $t_1$, i.e. the transmit timing between the LF and HF pulses, gives a lateral movement of the nonlinear interaction source term sub-regions. When $\theta(t_1,r)=m\pi$, $m=0,\pm 1, \ldots$, we have $\cos\theta(t_1,r)=\pm 1$ and $\sin\theta(t_1,r)=0$ and the HF pulse rides on the crest or trough of the LF wave. We then get a maximum of the delay term and the sum term of Eq. (17), i.e. $1^{st}$ and $2^{nd}$ term on right side of Eq. (17) while the $3^{rd}$ term on the right side of Eq. (17), the difference term, is zero. When $\theta(t_1,r)=(2m+1)\pi/2$, $m=0,\pm 1,\ldots$, i.e. $\cos\theta(t_1,r)=0$ and $\sin\theta(t_1,r)=\pm 1$ the HF pulse rides along the zeros of the LF wave and is located in a low value sub-region 309 where the difference term is maximum and the delay and sum terms are zero. However, with adequately short HF pulses the difference term is negligible and the sensitivity to the nonlinear interaction scattering (Group B) is low, as discussed above.

Figure 4:
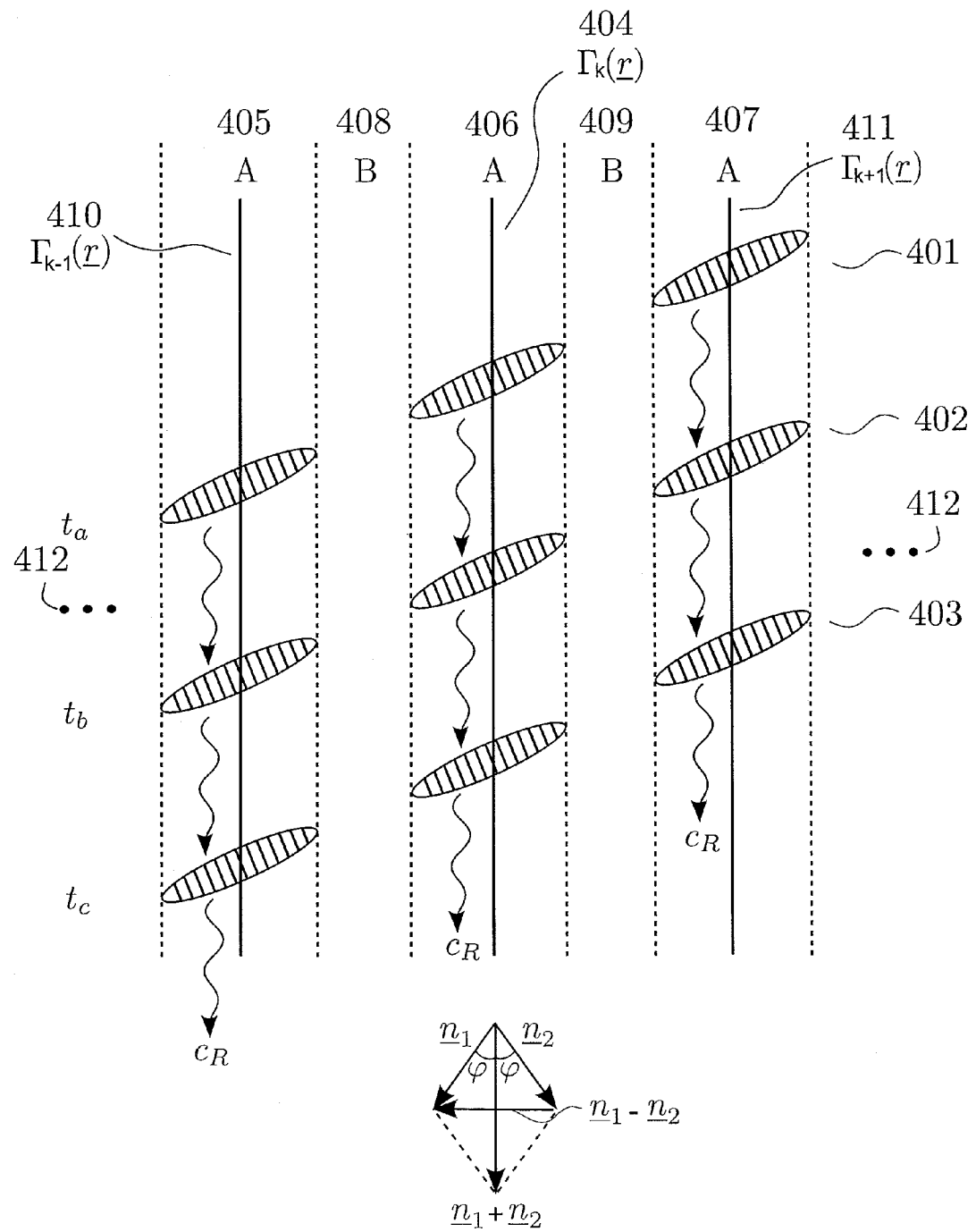
FIG. 4 illustrates propagation of sensitivity sub-regions arising from one set of 1$^{st}$ and 2$^{nd}$ transmit times and 1$^{st}$ and 2$^{nd}$ transmit beam directions.

With such a large difference between the HF bandwidth and the LF (e.g. $B_2 \sim 5f_1$) we can hence resolve multiple measurement or image curves in parallel for a single transmit event, where FIG. 4 by example illustrates 3 measurement or image curves $\Gamma_{k-1}(r)$, $\Gamma_k(r)$, $\Gamma_{k+1}(r)$ as 410, 404, 411, for 3 nonlinear interaction sub-regions shown for 3 different time points, $t_a$, $t_b$, $t_c$ as 401, 402, and 403. The nonlinear interaction source terms propagate downwards in the direction of $n_1+n_2$ with the velocity $c_R$ of Eq. (2), indicated by the curly arrows in the Figure. We see that there are regions (A-regions) of high nonlinear interaction for $\theta(t_1,r)=m\pi$, $m=0,\pm,\ldots$, where the sensitivity to imaging spatial variations in the nonlinear interaction parameters is high for adequately short HF pulses. Three A-regions 405, 406, and 407 are shown, but the A-regions can extend laterally further as indicated by the dots 412, depending on the length of the LF pulse and other details of the $1^{st}$ and $2^{nd}$ transmit beams 101 and 102. FIG. 4 also shows by example two B-regions 408 and 409 for low nonlinear interaction for $\theta(t_1,r)=(2m+1)\pi/2$, $m=0,\pm 1, \ldots$, where the sensitivity to imaging spatial variations in the nonlinear interaction parameters is low for adequately short HF pulses. The thickness of the overlap sub-regions (401, 402, 403) in the elevation direction (normal to the paper plane) is determined by the elevation thickness of the beam 101 and 102 that is thinnest in the elevation direction.

In a typical measurement situation we can have $f_2=10f_1$. The width of the A-type sub-regions in FIG. 4 is $cT_1/2\cos\phi = \lambda_1/2\cos\phi = 5\lambda_2\cos\phi$, where $T_1$ is the time period of the LF oscillation and $\lambda_1$ and $\lambda_2$ are the wavelengths of the LF and HF pulsed waves, respectively. The resolution of a focused receiver system for the HF is $\Delta r = 2\lambda_2 FN$ where $FN=F/D$ is the receiver F-number given as the ratio between the focus distance F and the aperture width (e.g. diameter) D, for example for the systems described in FIGS. 7-11. We see that the width of the sub-region is resolved with a focused receiver system with $FN<2.5\cos\phi$, which for $\phi=30$ deg gives $FN<2.1$. Such low F-numbers is achievable with many EM and EL receiver systems. One can hence with a parallel receiver system resolve several A-regions (e.g. 405, 406, 407) and receive the signal from these regions with dynamically focused parallel receive beams with beam width for example demonstrated by the dotted vertical lines on each side of the measurement or image curves $\Gamma_{k-1}(r)$, $\Gamma_k(r)$, $\Gamma_{k+1}(r)$. These parallel receive beams provide measurement or image signals for several curves (e.g. 410, 404, 411) in parallel, where the image data is obtained with the same transmit events and parallel processing on the received signal on multiple array elements according to known methods and further discussed in relation to instrument block diagram in FIG. 6.

Figure 5B:
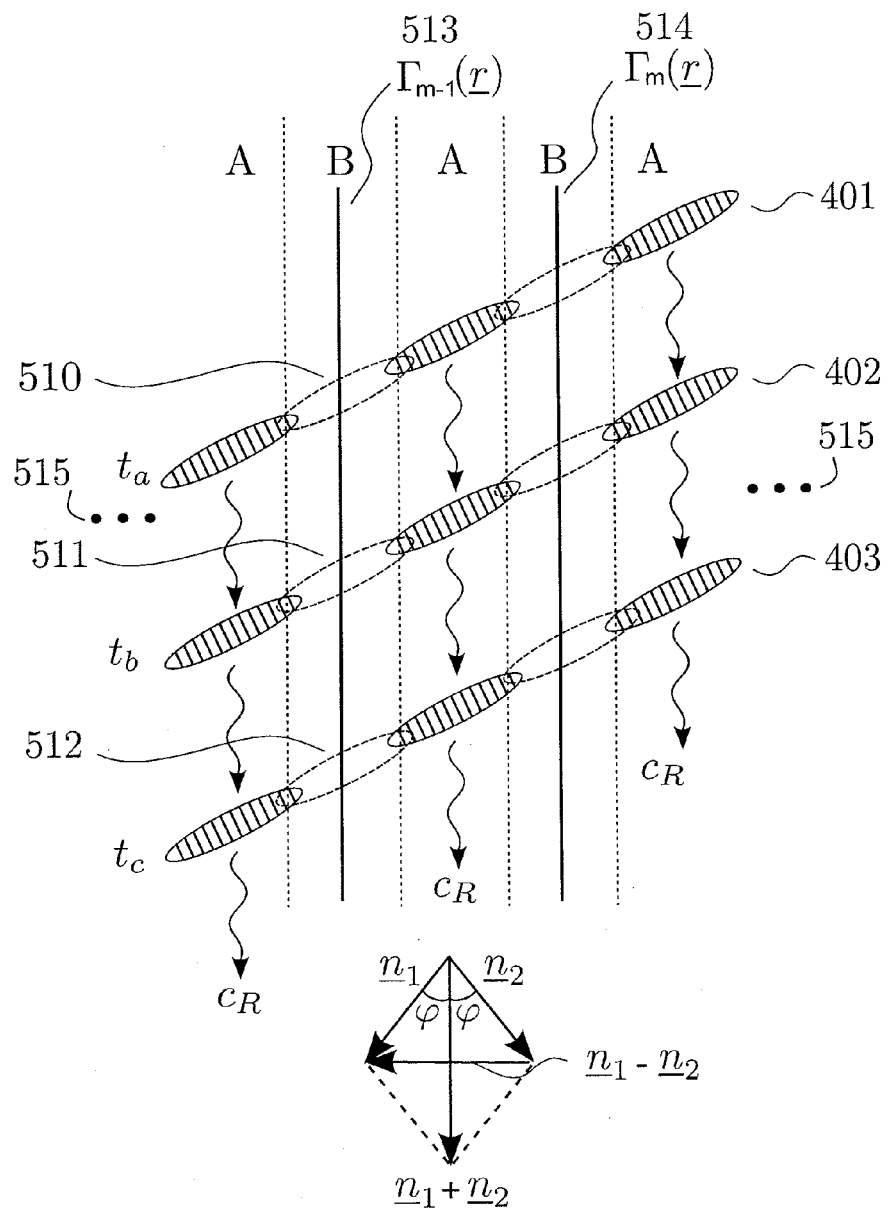

To increase the imaging sensitivity to the nonlinear interaction parameters in the regions B, we can transmit a $2^{nd}$ group of $1^{st}$ and $2^{nd}$ pulsed waves, where we change the timing relation between the $1^{st}$ and $2^{nd}$ pulses an amount $\Delta t_1 = \pi/2\omega_1$, as illustrated in FIG. 5a, where 501 shows the HF pulse for region B located at a zero of the LF pulse 502 with low imaging sensitivity to the nonlinear interaction parameters. In this Figure the HF pulse 501 and the LF pulse 502 illustrates the timing relation for the low sensitivity sub-regions, Region B, in FIG. 4. In the $2^{nd}$ transmit group, we change the difference in the transmit timing between the LF and HF pulses an amount $\Delta t_1 = \pi/2\omega_1$ so that the LF pulse gets the relative location 503, where the HF pulse 504 now rides on the peak LF field variable with maximal imaging sensitivity to the nonlinear interaction parameters in region B. This generates the sensitivity sub-regions 510, 511, and 512 for the time points $t_a$, $t_b$, and $t_c$ in the regions B of FIG. 5b together with the sensitivity sub-regions 401, 402, and 403 of the $1^{st}$ transmit group in FIG. 4. The dots 515 indicate that one can have more A and B regions laterally, depending on the length of the LF pulse and other details of the beams as discussed in relation to FIG. 4 above. With adequately high focal resolution of the receiver system as described in the example above (where $FN<2.5\cos\phi$), this change in $t_1$ provides measurement or new image curves, where one can use multiple parallel receive beams with parallel processing of the receive signals to provide image signals along several measurement or image curves in parallel with the same transmit events, where FIG. 5b by example shows two measurement or image curves $\Gamma_{m-1}(r)$, $\Gamma_m(r)$ as 513 and 514 for the B-regions. The total number of parallel measurement or image curves both for the A- and B-regions with the same transmit events depends on the detailed shape of the transmit pulses 104 and 105.

Large differences in the incident frequencies are also useful for enhanced imaging of resonant nonlinear scatterers, where the $2^{nd}$ transmit frequency is selected well above the resonance frequency for example to obtain high spatial resolution. One then selects the $1^{st}$ transmit frequency at or below the resonance frequency and uses the method described in relation to FIG. 2c to extract the signal from the nonlinear interaction resonant scatterers. This is for example useful for high resolution acoustic imaging of contrast agent microbubbles at frequencies well above the resonance frequency, as well as high resolution electromagnetic imaging of fluorescent molecules.

Using an increased repetition rate between the transmit events with a variation in the relative transmit timing $t_1$ between the $1^{st}$ and $2^{nd}$ pulsed waves, one can obtain further increased parallel measurement or imaging for multiple overlap regions $R_i(r,t)$, $i=2,\ldots$, propagating simultaneously along different measurement or image curves $\Gamma_i(r)$, $i=2,\ldots$, in the object. A focused receive system is in this case adapted to parallel observation of the scattered signal from the different overlap regions that propagate simultaneously in the object. This method also provides parallel measurements for incident frequencies $f_1$ and $f_2$ that are so close that $B_2 < f_1$ so that the overlap region does not break up into sub-regions as described for FIG. 3-5 where $B_2 \gg f_1$. The parallel receive imaging increases the potential frame rate, which opens up the possibility of averaging of the receive signals or image signals to improve signal to noise ratio and increase the sensitivity for imaging local nonlinear interaction scattering from the material.

In the above discussion we have assumed $2^{nd}$ order variation of the nonlinear material parameters with the wave field. This provides the simple nonlinear interaction term $2p_1(r,t) p_2(r,t)$ of Eq. (4), which further provides the convolution spectra of FIG. 2a-c. With more complex nonlinearity of the material parameters one can have further frequency components introduced by the nonlinear wave propagation and the nonlinear scattering. The $2^{nd}$ order nonlinearity is used for illustration purposes and is not meant to provide a limitation to the invention. The details for more complex nonlinear material parameters, for example wave propagation and scattering in materials containing nonlinearly resonant scatterers, can be introduced for each particular situation by anyone skilled in the art within the scope of the invention.

Figure 6:
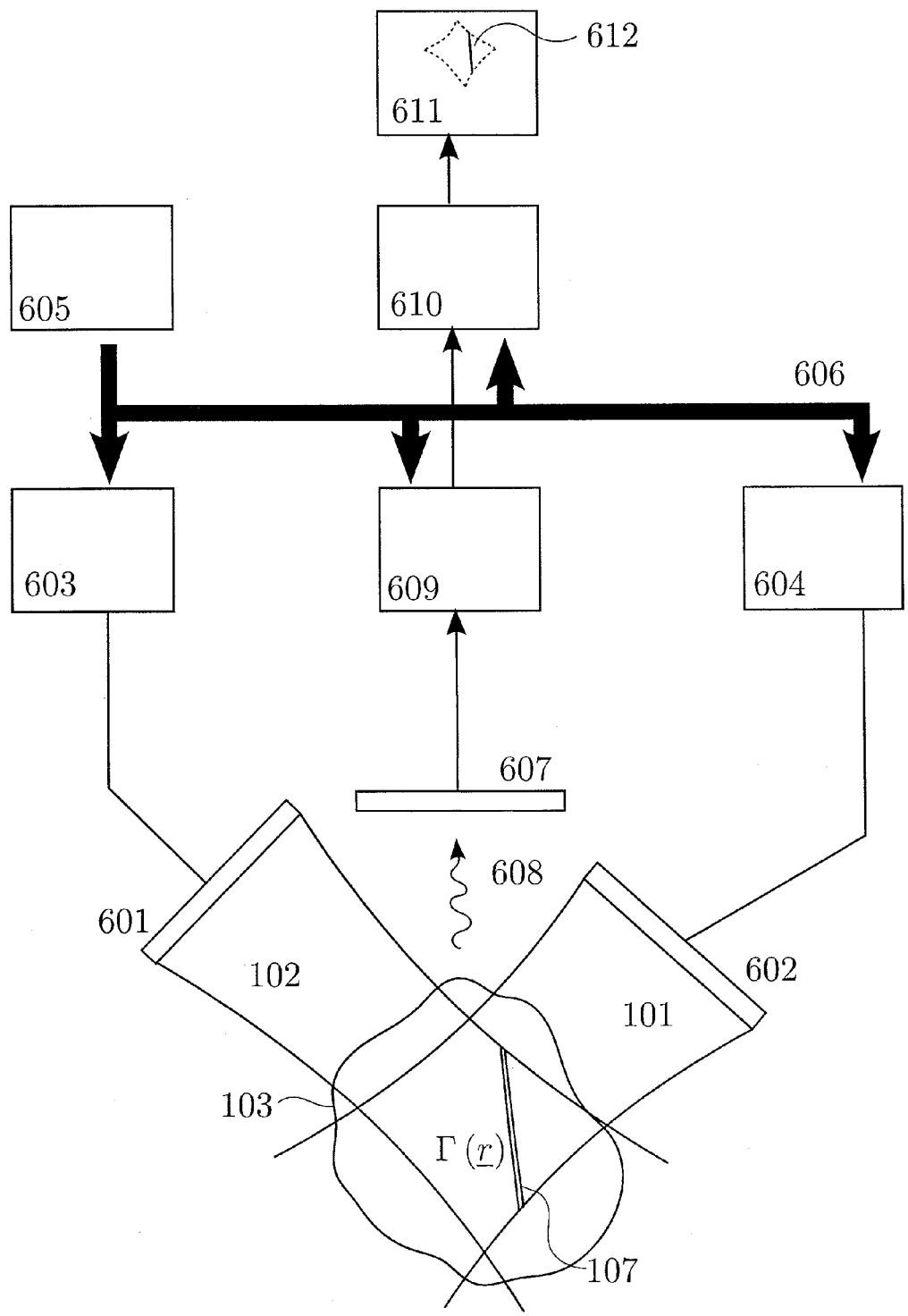
FIG. 6 shows a block diagram of an instrument according to the invention.

FIG. 6 shows a block diagram of an example instrument according to the invention, where the instrument may be operated according to the methods described. The instrument comprises means 601 and 602 for transmit of the pulsed wave beams 101 and 102 respectively into the object 103. At least one of the beams is wide in the azimuth direction (in the paper plane), and narrow in the elevation direction (normal to the paper plane), where this Figure shows an example where both beams 101 and 102 are wide in the azimuth plane. The transmit means are driven by transmitters 603 and 604 that are controlled in at least one of transmit timing and transmit amplitude and transmit frequency and transmit beam direction by the control unit 605 via the control bus 606. The control unit receives inputs from the instrument operator via a keyboard or other user interface to set up the instrument for the actual use, according to known methods. Alternatively the control unit 605 can receive inputs from software or from feedback mechanisms. A receiver means 607 picks up the scattered wave 608 from the object to form a receive signal that is forwarded to a receive signal pre-processing unit 609 where the output of this unit is forwarded to the image processing unit 610 for further processing according to the invention, so that the net result of the signal conditioning and processing in the units 607, 609 and 610 is extraction of the local nonlinear interaction scattering signal (Group B) along at least one measurement or image curve $\Gamma(r)$ (107), for example with the methods described in relation to FIGS. 2-5, and forming measurement or image signals that are transmitted to the display unit 611 for display. The display unit illustrates by example the image of the nonlinear interaction signal along one measurement or image curve $\Gamma(r)$ as an intensity or color modulated display line 612. The selection of the nonlinear scattering signal along the measurement or image curve $\Gamma(r)$ (107) can be partially or fully done in the receiver means 607, the preprocessing unit 609 or the image processing unit 610, or in all the units 607, 609 and 610 combined. By varying at least one of the transmit time relation between the $1^{st}$ and $2^{nd}$ transmitted pulses and the relative direction of the transmitted pulsed beams 101 and 102 the measurement or image curve 107 can be scanned laterally through a region of the object for example across a 2-dimensional surface-region or in 3 dimensions in a volume-region of the object, to provide 2-dimensional (2D) or 3-dimensional (3D) images of the region of the object.

The units in FIG. 6 represent functional units and can in various embodiments be combined in the same physical units (hardware), depending on preferred technology available and performance requirements. For example the control unit 605 and the image processing unit 610 can be combined as software modules on a single computer system, and the electronics of the units 603, 604, and 609 can be made as plug in units to the computer bus 606.

The transmit means 601 and 602 can similarly be combined in one physical unit, even also with the receiver means 607. An example of such a situation is found in FIG. 7 for ultrasound imaging, where 700 shows a linear ultrasound array placed on the surface 702 of the object 701. The ultrasound array operates according to known principles and can simultaneously transmit $1^{st}$ and $2^{nd}$ pulsed ultrasound waves 104 and 105 along the beams 101 and 102. For widely separated $1^{st}$ and $2^{nd}$ frequencies, one can for example use array solutions as described in U.S. Pat. No. 6,645,150 or U.S. Pat. No. 7,727,156. The scattered signal can be received with the same array with a receive beam 703 that encompasses the overlap region R(r,t) (106). The receive beam 703 does in this example encompass the whole measurement or image curve $\Gamma(r)$ (107), where one obtains spatial resolution along $\Gamma(r)$ through the time lag of the received signals. One should then note that the depth of the scattered signal propagates with the velocity $c_R$ of the overlap region R(r,t) in Eq. (2), while the back scattered signal propagates with the velocity c, and the conversion between receive time and depth along $\Gamma(r)$ takes this into account. The spatial resolution lateral to the receive beam can be improved by using a wide aperture, dynamically focused receive beam with FN<2.5 cos $\phi$ as described above and according to known principles. One can also use several side by side parallel receive beams that receive the signal from multiple A and B regions of FIGS. 4 and 5 in parallel, with parallel processing of the receive signals from all regions to speed up the frame rate according to known methods. The received signal can in this situation contain components scattered linearly from both inside and outside the overlap region R(r,t) and nonlinear interaction scattered signal components from inside R(r,t), particularly when there is a large difference between the $1^{st}$ and $2^{nd}$ frequencies. The nonlinear interaction scattered signal is then extracted in the units 609 and 610 of FIG. 6 through the methods described in relation to FIGS. 2-5.

Figure 7:
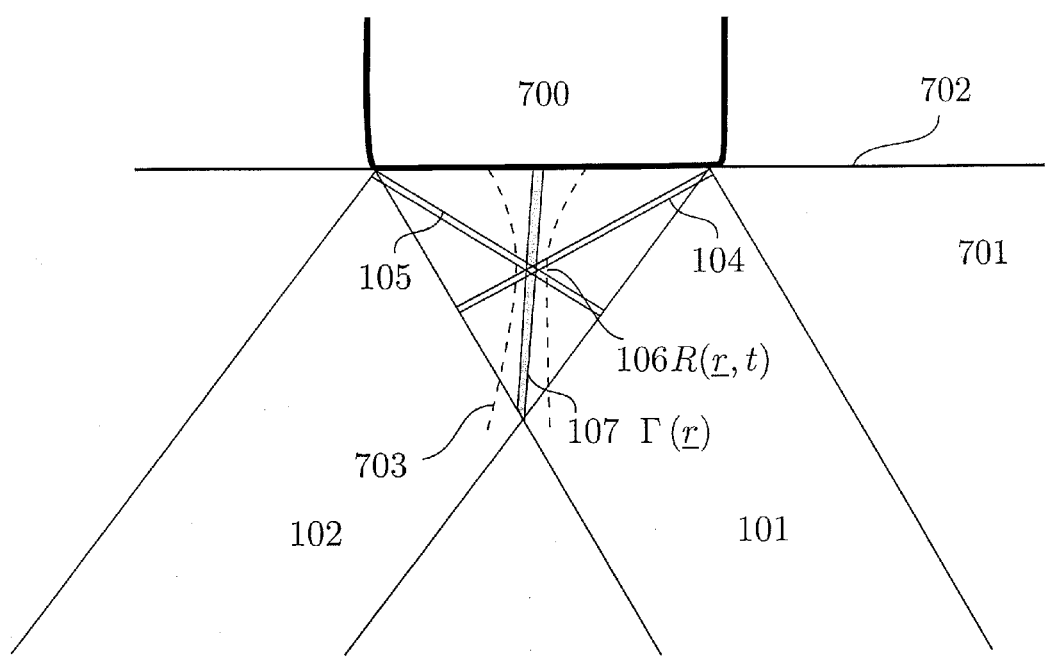
FIG. 7 shows an example embodiment of 1$^{st}$ and 2$^{nd}$ wave transmit means and receive means for detecting the nonlinear interaction scattered signal for ultrasound waves.
Figure 8:
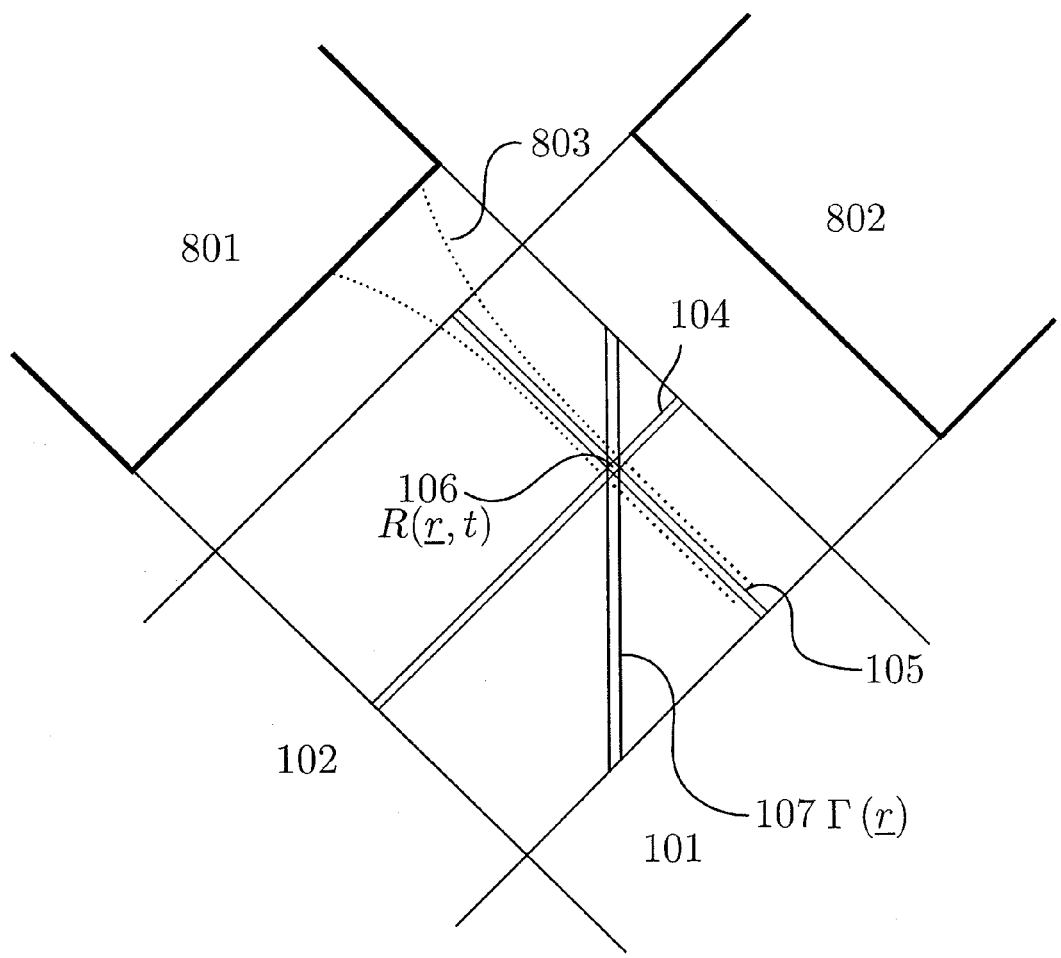
FIG. 8 shows another example embodiment of 1$^{st}$ and 2$^{nd}$ wave transmit means and receive means for detecting the nonlinear interaction scattered signal for ultrasound waves.

The depth of the nonlinear interaction scattering image field in FIG. 7 is bounded by the width of the beams 101 and 102, and hence gets a triangular form. An embodiment which provides a rectangular form of the nonlinear interaction scattering image region is shown in FIG. 8, where the transmitting means for the $1^{st}$ and $2^{nd}$ beams 101 and 102 are physically separated, linear ultrasound transducer arrays 801 and 802. The designations for the $1^{st}$ and $2^{nd}$ pulsed waves (104, 105), the overlap region R(r,t) (106) and the measurement or image curve $\Gamma(r)$ (107) are the same as in FIGS. 1a and 7. A receive beam from the $1^{st}$ array 801 focused onto the overlap region R(r,t) is shown as 803. It should be noted that in this case the shown receive beam does not cover the whole measurement or image curve $\Gamma(r)$, and therefore to receive all nonlinear interaction signals along $\Gamma(r)$ the beam position/direction must be steered together with the focal depth. This can in one example be done by selecting the active receive elements on the fly, and/or adjusting delays for proper direction steering and focusing of the beam so that the focus follows the overlap region R(r,t) as it moves in real time, according to known methods. In another example one can receive the scattered signal on all receive elements of 801 in parallel and form focused image beams in parallel in the processing unit so that one obtains a receive beam focus that follows the overlap region R(r,t), according to known methods.

Figure 9:
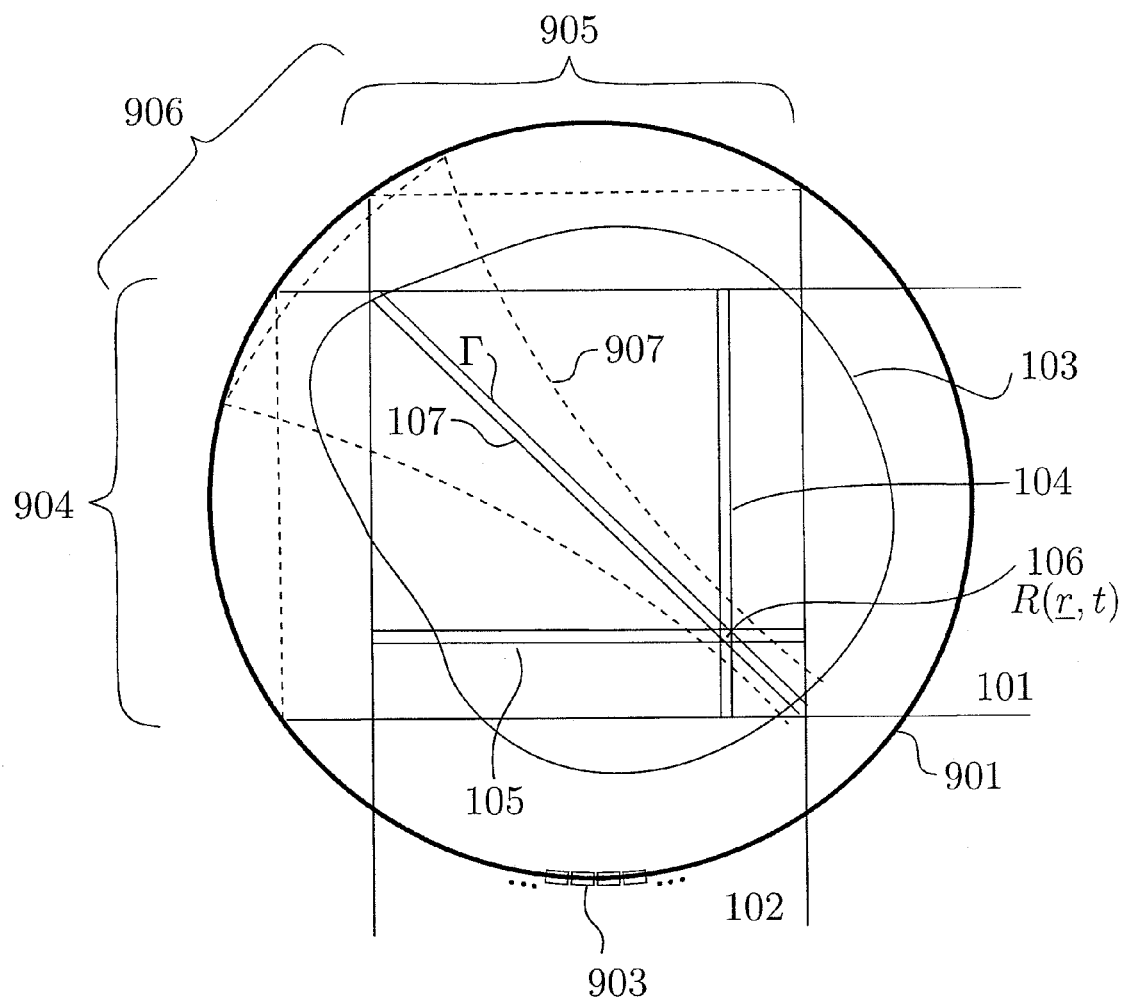
FIG. 9 shows yet another example embodiment of 1$^{st}$ and 2$^{nd}$ wave transmit means and receive means for detecting the nonlinear interaction scattered signal for ultrasound waves.

FIG. 9 shows yet another embodiment of integrated transmit and receive means for ultrasound imaging according to the invention, where the ultrasound array is arranged as a ring

901. This embodiment has advantages when the object 103 can be surrounded by the array, for example with breast imaging, in that it allows tomographic image reconstructions according to known methods. The array is composed of individual elements 903 along the whole ring 901 which gives a large flexibility to select elements for both the transmit and the receive apertures. In this example a group 904 of elements is selected to form the $1^{st}$ transmit aperture to transmit the $1^{st}$ pulsed wave beam 101 and another group 905 of elements to form the $2^{nd}$ transmit aperture to transmit the $2^{nd}$ pulsed wave beam 102. The designations for the $1^{st}$ and $2^{nd}$ pulsed waves (104, 105), the overlap region R(r,t) (106) and the measurement or image curve Γ(r) (107) are the same as in FIGS. 1*a*, 7, and 8. The example further illustrates selection of a receive group of elements 906 that gives a receive beam 907 so that the axis of the receive beam is along the measurement or image curve Γ(r) (107) for its whole length. Scanning of the curve Γ(r) to form an image can for example be done by varying the relation between the $1^{st}$ and $2^{nd}$ transmit times of the $1^{st}$ and $2^{nd}$ pulsed waves, or one can vary the $1^{st}$ and $2^{nd}$ beam directions of the $1^{st}$ and $2^{nd}$ pulsed waves through selecting different elements that participate in the $1^{st}$ (904) and $2^{nd}$ (905) transmit apertures and also using variable delays for the transmit pulses for different elements, according to known methods. Selection of the elements for the receive aperture (905) and potential delay steering of the signal from the elements, is then done to match the scanning of the receive beam along each actual measurement or image curve Γ(r).

In FIGS. 1*a* and 7-9, the pulsed wave-fronts are illustrated as fairly straight lines, that produce measurement or image curves Γ(r) that also are straight lines. In the practical situation, diffraction with the limited apertures makes the wave fronts somewhat curved, especially at the edges of the beams. This produces some curvature of the measurement or image curves Γ(r), which can be accounted for in electronic receive beam steering. In the same Figures we have illustrated that the $1^{st}$ and $2^{nd}$ transmit beams are in the same plane. This can be an advantage in many situations, as the lateral scanning of the curves Γ(r) can be obtained through a variation of the transmit timing relation of the $1^{st}$ and $2^{nd}$ pulsed wave. However, it is clear from the general principle of the invention, that the $1^{st}$ and $2^{nd}$ transmit beams can be in different planes that cross each other where the transmit timing relation must be adjusted to how the beams cross each other, which can in a practical situation be adapted by anyone skilled in the art.

Another example of a modification of the transmit and receive means according to the invention is shown in FIG. 10 as 1001 on the surface of the object 1000, where one of the $1^{st}$ and $2^{nd}$ transmit beams is a narrow beam 1002 and the other of the $1^{st}$ and $2^{nd}$ transmit beams is a wide beam 1003 at least in the azimuth plane. The transmit pulse along the beam 1003 must then be adequately long, shown as 1004, so that one gets interaction between the two pulsed waves 1004 and 1007 for the whole length of desired image range along 1002. The measurement or image curve Γ(r) is the axis 1006 of the narrow beam 1002, and the receive beam axis is preferably aligned along the axis of the narrow beam 1002. The overlap region R(r,t) 1005 is then given by the overlap of the long pulse 1004 of the wide (1003) beam and the short transmit pulse 1007 of the narrow beam (1002). To get best possible resolution it is advantageous that the high frequency pulse is transmitted along the narrow beam. Due to the skewed propagation directions between the $1^{st}$ and $2^{nd}$ beams, one will have regions of high and low sensitivity to nonlinear interaction scattering along the beam 1002, similar to that illustrated in FIGS. 4 and 5. One can move the regions of high sensitivity along 1002 by changing the difference in transmit timing between the $1^{st}$ and $2^{nd}$ transmit pulses similar to that illustrated in FIGS. 5*a* and *b*, as can be adapted by anyone skilled in the art. To get full sensitivity to nonlinear interaction scattering along the whole receive beam, one must then transmit more than one transmit event with different time lags between said $1^{st}$ and $2^{nd}$ transmit times. The measurement or image curve Γ(r) is scanned laterally by lateral scanning of the narrow beam.

Figure 11:
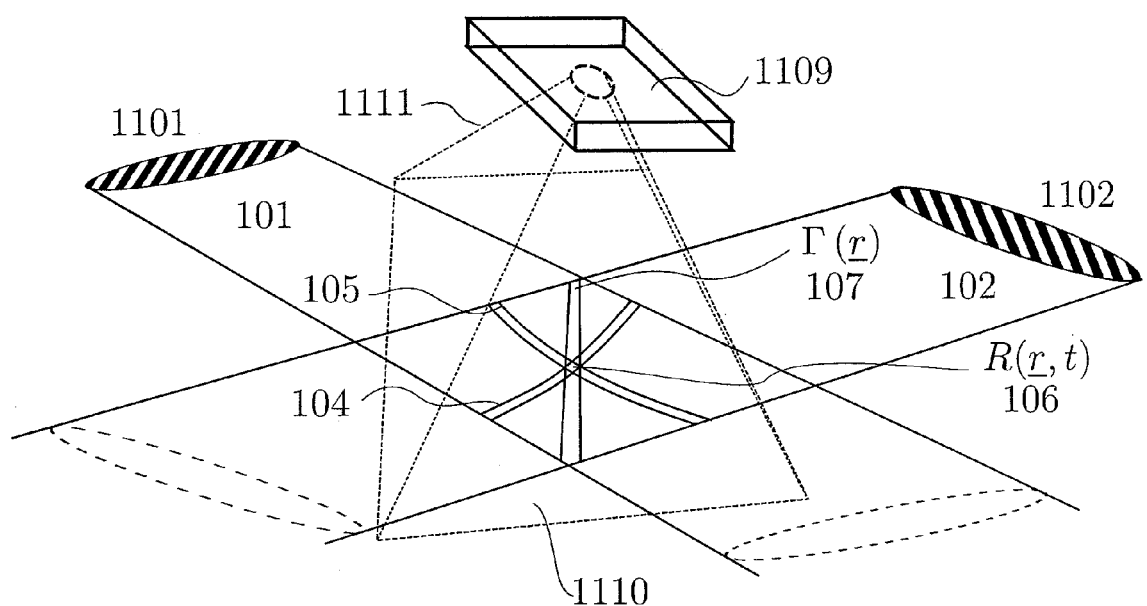
FIG. 11 shows an embodiment where the receiver system is a camera.

In FIGS. 7-10 we have used ultrasound imaging as an example, but similar geometrical arrangements of transmitters and receivers can according to the invention also be used with EM waves. For EM imaging with frequencies in the GHz and THz range, the transmit means and receive means can be strip antennas or maser/laser diodes, and arrays of elements of these. For EM imaging in the infrared-optical frequency range, simple solutions for the transmit means are arrays of laser diodes, or mechanically direction steered laser diodes. Simple solutions for the receive detector means can be light sensing diodes/transistors or focused camera systems (e.g. a CCD camera) that provides real time imaging of the scattered signal from R(r,t) along Γ(r), where the lateral scanning of Γ(r) through changes in the relative transmit timing of the $1^{st}$ and $2^{nd}$ pulsed waves and/or the $1^{st}$ and $2^{nd}$ beam directions, is directly observable. An example embodiment of such a receive means is shown in FIG. 11, where 1101 and 1102 show the transmit means for the $1^{st}$ and $2^{nd}$ beams 101 and 102, with the pulsed wave fronts 104 and 105 with the overlap region R(r,t) (106) and the measurement or image curve Γ(r) (107). The receiver means is an EM camera system 1109 with an observation cone 1111 focused onto the observation region of nonlinear interaction scattered signal from the region 1110 covering the interaction between the two transmit beams 101 and 102.

To further increase the sensitivity to the nonlinear interaction scattered signal, one can conveniently average the receive signal or image signal from many transmit events for each individual measurement or image curve Γ(r), according to known methods.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention.

It is also expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for measurement or imaging of nonlinear interaction scattering between two waves along at least one measurement or image curve Γ(r) in a material object with nonlinear material parameters that produce wave scattering, comprising the steps of:
   a) transmitting in at least one transmit event i) at least one $1^{st}$ transmit pulsed wave with a $1^{st}$ transmit time and a $1^{st}$ transmit center frequency along a $1^{st}$ transmit beam with a 1st transmit direction, and ii) at least one $2^{nd}$ transmit pulsed wave with a $2^{nd}$ transmit time and a $2^{nd}$ center frequency along a $2^{nd}$ transmit beam with a $2^{nd}$ transmit direction, wherein the $2^{nd}$ transmit direction is substantially different from the $1^{st}$ transmit direction, and where the $1^{st}$ and $2^{nd}$ transmit directions and $1^{st}$ and $2^{nd}$ transmit times are arranged so that the pulses from the $1^{st}$ and $2^{nd}$ pulsed waves overlap in space in an overlap region $R(r,t)$ that propagates with time in the material object along a measurement or image curve $\Gamma(r)$, and b) selecting one or both of i) the time relation between said $1^{st}$ and $2^{nd}$ transmit times, and ii) at least one of said $1^{st}$ and $2^{nd}$ transmit directions, to control the location of the measurement or image curve $\Gamma(r)$ within the material object, and c) detecting a wave scattered from the overlap region $R(r,t)$ with at least one receiver and generating at least one receive signal that includes at least nonlinear interaction scattered signal components that relate to waves that are scattered from the nonlinear interaction between said $1^{st}$ and $2^{nd}$ pulsed waves in said overlap region $R(r,t)$, and d) processing the receive signal to extract the nonlinear interaction scattered signal components and to form nonlinear interaction measurement or image signals along said measurement or image curve $\Gamma(r)$.

2. A method for measurement or imaging according to claim 1, where the process to extract nonlinear interaction signal components includes temporal frequency filtering of the receive signal where said filtering passes said nonlinear interaction scattered signal components and blocks other temporal frequency components.

3. A method for measurement or imaging according to claim 1, where:

said transmitting step comprises at least two transmit events and where said $1^{st}$ and 2nd transmit directions and the time lag between said $1^{st}$ and $2^{nd}$ transmit times are the same for said at least two transmit events, and where one of said $1^{st}$ and $2^{nd}$ pulsed waves is varied in at least one of polarity, amplitude, phase and frequency between said at least two transmit events, including the possibility that at least one of said $1^{st}$ and $2^{nd}$ pulsed waves has zero amplitude for at least one of said transmit events, and where the process to extract nonlinear signal components includes combining of the receive signals from said at least two transmit events.

4. A method for measurement or imaging according to claim 3, where the receive signal from at least one of said at least two transmit events is one or both of i) delay corrected and ii) pulse distortion corrected, before the signals from said at least two transmit events are combined.

5. A method for measurement or imaging of nonlinear interaction scattering according to claim 1, where:

a plurality of measurement or image curves $\Gamma_k(r)$, k=1 ... K, is selected in the material object through selecting one or both of i) the time relation between said $1^{st}$ and $2^{nd}$ transmit times, and ii) at least one of said $1^{st}$ and $2^{nd}$ transmit directions, and the measurement or image signals corresponding to each one of the plural measurement or image curve $\Gamma_k(r)$ are obtained.

6. A method for measurement or imaging of nonlinear interaction scattering according to claim 1, where said transmitting step comprises a plurality of transmit events, and the time difference between said transmit events is sufficiently short that at least two different overlap regions $R(r,t)$ propagate simultaneously within the object, and one or both of the relative timing between said $1^{st}$ and $2^{nd}$ transmit pulse and said $1^{st}$ and 2nd transmit directions is varied between the transmit events so that said at least two different overlap regions propagate along at least two different measurement or image curves $\Gamma(r)$ and the scattered signals from said different overlap regions are received and processed in parallel for improved rate of measurement or imaging.

7. A method for measurement or imaging according to claim 3, where:

the pulse length of one of said $1^{st}$ and $2^{nd}$ pulsed waves is shorter than half the time oscillation period of the other of said $1^{st}$ and $2^{nd}$ waves so that the nonlinear interaction overlap region breaks up into sub-regions of high sensitivity where the magnitude of the wave field of said other of said $1^{st}$ and $2^{nd}$ waves is sufficiently high so that the scattered signal is obtained with high sensitivity from a set $\Gamma_k(r)$, k=1 ... K of more than one measurement or image curves in parallel, and the receive signal from said more than one measurement or image curves is received and processed in parallel to obtain the image signal for said more than one measurement or image curves in parallel.

8. A method for measurement or imaging according to claim 1, where received signals from a plurality of transmit events for the same measurement or image curves $\Gamma(r)$ are averaged to reduce noise and improve sensitivity.

9. A method for measurement or imaging of nonlinear interaction scattering according to claim 5, where image signals for image points between a plurality of said measurement or image curves $\Gamma_k(r)$ are obtained through interpolation between image signals on at least two measurement or image curves.

10. A method for measurement or imaging of nonlinear interaction scattering according to claim 5, where a plurality of said measurement or image curves $\Gamma_k(r)$ are spatially distributed across a surface to obtain image signals for a two dimensional image of nonlinear interaction scattering across said surface.

11. A method for measurement or imaging of nonlinear interaction scattering according to claim 5, where said plurality of measurement or image curves $\Gamma_k(r)$ are spatially distributed within a three-dimensional region to obtain image signals for a three-dimensional image of nonlinear interaction scattering in said region.

12. An apparatus for measurement or imaging of nonlinear interaction scattering between two waves along at least one measurement or image curve $\Gamma(r)$ in a material object with nonlinear material parameters that produce wave scattering, comprising:

a) transmit means arranged to transmit at least one transmit event composed of i) at least one $1^{st}$ transmit pulsed wave with a $1^{st}$ transmit time and a $1^{st}$ transmit center frequency along a $1^{st}$ transmit beam with a $1^{st}$ transmit direction, and ii) at least one $2^{nd}$ transmit pulsed wave with a $2^{nd}$ transmit time and a $2^{nd}$ transmit center frequency along a $2^{nd}$ transmit beam with a $2^{nd}$ transmit direction, wherein the $2^{nd}$ transmit direction is substantially different from the $1^{st}$ transmit direction, and where the transmit means is arranged such that said $1^{st}$ and 2nd pulsed waves overlap in an overlap region $R(r,t)$ of the material object, where said overlap region propagates with time in the material object along a measurement or image curve $\Gamma(r)$, and b) control means arranged to select one or both of i) the time relation between said $1^{st}$ and $2^{nd}$ transmit times, and ii) at least one of said $1^{st}$ and $2^{nd}$ transmit directions, to control the location of the measurement or image curve $\Gamma(r)$ in space within the material object, and c) receive means arranged to receive scattered wave components from the material object at least from the nonlinear interaction between said $e^t$ and $2^{nd}$ pulsed waves in said overlap region R(r,t), and arranged to produce at least one receive signal containing at least nonlinear interaction scattered components from at least said overlap region R(r,t), and d) processing means arranged to process said receive signal to extract the nonlinear interaction scattered signal components from said overlap region R(r,t) to form nonlinear interaction measurement or image signals along the at least one measurement or image curve $\Gamma(r)$.

13. An apparatus according to claim 12, where said processing means comprises means for temporal frequency filtering of the receive signal where said filtering passes said nonlinear interaction scattered signal components and blocks other temporal frequency components.

14. An apparatus according to claim 12, where:
said transmit means is arranged to transmit at least two transmit events for each measurement or image curve $\Gamma(r)$, and
said transmit means comprises means for varying at least one of polarity, amplitude, phase and frequency of one of said $1^{st}$ and $2^{nd}$ pulsed waves between said at least two transmit events, including the possibility that at least one of said $1^{st}$ and $2^{nd}$ pulsed waves to has zero amplitude for at least one of said at least two transmit events, and where
said processing means comprises means for combining the receive signals from at least two transmit events in the process of forming image signals along said measurement or image curve $\Gamma(r)$.

15. An apparatus according to claim 14, where said processing means comprises means to correct at least one receive signal from at least one of said at least two transmit events with one or both of i) delay correction and ii) pulse distortion correction, before the signals from at least two transmit events are combined.

16. An apparatus according to claim 15, where said processing means comprises means for estimation of one or both of i) delay correction and ii) pulse distortion correction.

17. An apparatus according to claim 12, where said means for receiving comprises a focused receiver system.

18. An apparatus according to claim 17, where said focused receiver system is arranged to be dynamically focused with time such that the focus follows the overlap region R(r,t) as the overlap region R(r,t) moves with time.

19. An apparatus according to claim 17, where said focused receiver system is a focused camera.

20. An apparatus according to claim 17, where said focused receiver system comprises:
an array of multiple receiver elements that are arranged to receive the scattered signals in parallel, and
means to generate multiple receive signals from multiple groups of receiver elements in parallel such that different receive signals are assigned to different measurement or image curves $\Gamma_m(r)$, m=1 . . . M in parallel.

21. An apparatus according to claim 20, where said control means comprises means to transmit multiple groups of transmit events to receive multiple receive signals for each measurement or image curve $\Gamma(r)$ and means for processing said multiple receive signals by at least one of:
i) averaging of the receive signals to increase signal to noise ratio and hence sensitivity, and
ii) comparing differences between said multiple receive signals to determine movement of the scatterers.

22. An apparatus according to any of claim 12, where said control means comprises means to scan said measurement or image curve $\Gamma(r)$ through a set of different measurement or image curves $\Gamma_k(r)$, k=1 . . . K in a region of the material object through varying one or both of i) the time relation between said $1^{st}$ and $2^{nd}$ transmit times, and ii) at least one of said $1^{st}$ and $2^{nd}$ transmit directions.

23. An apparatus according to claim 22, where said means for processing comprises means for interpolating image signals between neighboring measurement or image curves $\Gamma_k(r)$ to 44 generate image signals for image points between said neighboring measurement or image curves.

24. An apparatus according to claim 21, where said control means comprises means for scanning said measurement or image curves across a surface through said material object to provide image signals for a two dimensional image of nonlinear interaction scattering across said surface.

25. An apparatus according to claim 21, where said control means includes means for scanning said measurement or image curves within a three-dimensional region of said material object to provide image signals for a three-dimensional image of nonlinear interaction scattering in said region.

26. An apparatus according to claim 12, where at least one of said $1^{st}$ and 2nd transmit beams is wide in at least an azimuth direction.

27. An apparatus according to claim 12, wherein at least one of said $1^{st}$ and 2nd transmit beams is narrow in the elevation direction.

28. An apparatus according to claim 26, where the other of said $1^{st}$ and $2^{nd}$ transmit beams is narrow in at least the azimuth direction, and the receive means comprises a focused receive beam with axis along the axis of the transmit beam which is narrow in the azimuth direction, and scanning of the measurement or image curve is obtained by scanning of both the receive beam and the transmit beam which is narrow in the azimuth direction.

29. An apparatus according to claim 12, where said transmit means and said receive means comprise arrays of elements where the same array surface can be used to transmit both said $1^{st}$ and $2^{nd}$ pulsed waves and to receive at least the nonlinear interaction scattered signal.

30. An apparatus according to claim 12, where said transmit means comprises an array of elements to transmit said $1^{st}$ pulsed wave and another array of elements to transmit said $2^{nd}$ pulsed wave.

31. An apparatus according to claim 12, where said transmit means comprises a ring array of elements.

32. An apparatus according to claim 12, where at least one of said $1^{st}$ and 2nd pulsed waves is an elastic compression wave.

33. An apparatus according to claim 12, where at least one of said $1^{st}$ and 2nd pulsed waves is an elastic shear wave.

34. An apparatus according to claim 12, where at least one of said $1^{st}$ and 2nd pulsed waves is an electromagnetic wave.

* * * * *